US010329411B2

(12) United States Patent
Igarashi et al.

(10) Patent No.: US 10,329,411 B2
(45) Date of Patent: Jun. 25, 2019

(54) RESIN COMPOSITION AND MULTILAYERED STRUCTURE USING SAME

(75) Inventors: Takeyuki Igarashi, Kurashiki (JP); Yasuhiko Haneda, Chiyoda-ku (JP); Masahiro Kitamura, Chiyoda-ku (JP); Shinji Tai, Pasadena, TX (US)

(73) Assignee: KURARAY CO., LTD., Kurashiki-shi (JP)

( * ) Notice: Subject to any disclaimer, the term of this patent is extended or adjusted under 35 U.S.C. 154(b) by 888 days.

(21) Appl. No.: 13/637,448

(22) PCT Filed: Mar. 25, 2011

(86) PCT No.: PCT/JP2011/057331
§ 371 (c)(1),
(2), (4) Date: Sep. 26, 2012

(87) PCT Pub. No.: WO2011/118762
PCT Pub. Date: Sep. 29, 2011

(65) Prior Publication Data
US 2013/0040157 A1 Feb. 14, 2013
US 2013/0244048 A9 Sep. 19, 2013

(30) Foreign Application Priority Data

Mar. 26, 2010 (JP) ................................ 2010-073601
Jun. 23, 2010 (JP) ................................ 2010-142902

(51) Int. Cl.
| | |
|---|---|
| C08L 23/02 | (2006.01) |
| C08L 23/08 | (2006.01) |
| C08K 3/22 | (2006.01) |
| C08K 5/098 | (2006.01) |
| B32B 27/06 | (2006.01) |
| B32B 27/20 | (2006.01) |
| B32B 27/30 | (2006.01) |
| B32B 27/32 | (2006.01) |
| C08K 5/00 | (2006.01) |
| C08L 29/04 | (2006.01) |

(52) U.S. Cl.
CPC .............. *C08L 23/02* (2013.01); *B32B 27/06* (2013.01); *B32B 27/20* (2013.01); *B32B 27/306* (2013.01); *B32B 27/32* (2013.01); *C08L 23/0861* (2013.01); *B32B 2270/00* (2013.01); *B32B 2439/70* (2013.01); *B32B 2439/80* (2013.01); *C08K 5/0041* (2013.01); *C08K 5/098* (2013.01); *C08K 2003/2241* (2013.01); *C08L 29/04* (2013.01); *C08L 2205/035* (2013.01); *C08L 2666/06* (2013.01); *Y10T 428/31928* (2015.04)

(58) Field of Classification Search
CPC ...... C08L 23/0861; C08L 23/02; C08L 23/04; C08L 2666/06; C08L 23/025; C08L 23/06; C08L 23/0807; C08L 23/0815; C08L 23/0823; C08L 23/083; C08L 23/0838; C08L 23/10; C08L 23/12; C08L 23/14; C08L 23/142; C08L 23/145; C08L 23/16; C08L 23/0853
See application file for complete search history.

(56) References Cited

U.S. PATENT DOCUMENTS

| | | | | | |
|---|---|---|---|---|---|
| 3,767,455 | A | * | 10/1973 | Claridge | .................. C09C 1/24 106/438 |
| 3,931,449 | A | * | 1/1976 | Hirata | .................. A23L 1/0064 264/173.14 |
| 4,125,412 | A | * | 11/1978 | West | .................... C09C 1/3661 106/446 |
| 4,753,760 | A | | 6/1988 | Kawaguchi et al. | |
| 5,094,921 | A | | 3/1992 | Itamura et al. | |
| 5,389,709 | A | | 2/1995 | Itamura et al. | |
| 5,468,471 | A | * | 11/1995 | Zecchino | ................. A61K 8/29 424/59 |
| 5,492,953 | A | | 2/1996 | Itamura et al. | |
| 5,744,547 | A | | 4/1998 | Moritani et al. | |
| 5,753,025 | A | * | 5/1998 | Bettler | ................. C09C 1/3692 106/442 |
| 6,087,433 | A | | 7/2000 | Hanada et al. | |
| 6,288,165 | B1 | | 9/2001 | Moritani et al. | |
| 6,455,158 | B1 | * | 9/2002 | Mei | ......................... C08K 9/06 428/403 |

(Continued)

FOREIGN PATENT DOCUMENTS

| | | |
|---|---|---|
| EP | 0 400 604 A2 | 12/1990 |
| EP | 0 401 666 A2 | 12/1990 |

(Continued)

OTHER PUBLICATIONS

Swiler, Pigments, Inorganic, 2005, Kirk-Othmer Encyclopedia of Chemical Technology, pp. 1-16.*

(Continued)

*Primary Examiner* — Monique R Jackson
(74) *Attorney, Agent, or Firm* — Oblon, McClelland, Maier & Neustadt, L.L.P.

(57) ABSTRACT

A resin composition, containing: (A) polyolefin; (B) a saponified ethylene-vinyl acetate copolymer having an ethylene content of from 20 to 65 mol % and a degree of saponification of vinyl acetate units of 96% or more; (C) a saponified ethylene-vinyl acetate copolymer having an ethylene content of from 68 to 98 mol % and a degree of saponification of vinyl acetate units of 20% or more; (D) a random copolymer consisting of ethylene and vinyl acetate; (E) a pigment comprising titanium oxide particles comprising a surface coated with a compound of a metal other than titanium or a silicon compound; and (I) a lubricant; wherein a mass ratio (AB) is from 3 to 99.5, a mass ratio (B/C) is from 1 to 100, a mass ratio of (D/C) is from 0.1 to 15, a mass ratio (E/C) is from 0.04 to 50, and a content of (C) is from 0.01 to 2.4 parts, particularly 0.33 to 1.5 parts, by mass based on 100 parts by mass of (A) and (B). A molded product, in particular a multilayered structure, obtained by melt molding the resin composition has good dispersibility of the pigment, and improved uneven coloration.

10 Claims, No Drawings

(56) References Cited

U.S. PATENT DOCUMENTS

| | | | |
|---|---|---|---|
| 2003/0229172 A1* | 12/2003 | Batz-Sohn | A61K 8/04 524/430 |
| 2010/0255330 A1 | 10/2010 | Ninomiya et al. | |
| 2011/0091734 A1 | 4/2011 | Kazeto | |
| 2012/0009431 A1 | 1/2012 | Kazeto | |
| 2012/0196970 A1 | 8/2012 | Igarashi et al. | |

FOREIGN PATENT DOCUMENTS

| | | |
|---|---|---|
| EP | 2 194 093 A1 | 6/2010 |
| EP | 2 275 481 A2 | 1/2011 |
| EP | 2 407 508 A2 | 1/2012 |
| JP | 62-106904 | 5/1987 |
| JP | 3 72541 | 3/1991 |
| JP | 6-65507 | 3/1994 |
| JP | 9 71620 | 3/1997 |
| JP | 11 255993 | 9/1999 |
| JP | 2000 53812 | 2/2000 |
| JP | 2000 63683 | 2/2000 |
| JP | 2001-164059 | 6/2001 |
| JP | 2009 97010 | 5/2009 |

OTHER PUBLICATIONS

U.S. Appl. No. 13/638,730, filed Oct. 1, 2012, Igarashi, et al.

U.S. Appl. No. 13/643,583, filed Oct. 26, 2012, Igarashi, et al.

Extended European Search Report dated Jul. 3, 2015 in Patent Application No. 11759566.0.

International Search Report dated Jun. 14, 2011 in PCT/JP11/057331 Filed Mar. 25, 2011.

U.S. Appl. No. 12/991,757, filed Nov. 9, 2010, US2011/0091734 A1, Kazeto.

U.S. Appl. No. 13/256,110, filed Sep. 12, 2011, US2012/0009431 A1, Kazeto.

U.S. Appl. No. 13/499,831, filed Apr. 2, 2012, US2012/0196970 A1, Igarashi, et al.

Office Action (Notification of Reasons for Rejection) dated Mar. 15, 2016, in corresponding Japanese Patent Application No. 2014-197026 (with English-language Translation and Certificate of Translation).

Office Action (Notification of Reasons for Rejection) dated Jul. 11, 2017, in Japanese Patent Application No. 2016-097086 (with certified English-language Translation).

* cited by examiner

RESIN COMPOSITION AND MULTILAYERED STRUCTURE USING SAME

TECHNICAL FIELD

The present invention relates to a resin composition containing polyolefin, saponified ethylene-vinyl acetate copolymers, and a pigment. The present invention also relates to a multilayered structure made of the resin composition.

BACKGROUND ART

Conventionally, multilayered structures including a layer made of a thermoplastic resin represented by polyolefin, such as polyethylene and polypropylene, and a layer made of a saponified ethylene-vinyl acetate copolymer (hereinafter, may be abbreviated as an EVOH) excellent in barrier properties are widely used for various applications, particularly such as food packaging containers and fuel containers, taking advantage of their barrier properties. Such a multilayered structure is used as various molded products, such as a film, a sheet, a cup, a tray, and a bottle. At this time, there is a case that chips, defective products, and the like generated when obtaining the various molded products are collected and melt molded to be reused as at least one layer of a multilayered structure including a thermoplastic resin layer and an EVOH layer. Such a recovery technique is useful from the perspective of the reduction of wastes and the economic efficiency and is employed widely.

However, when reusing a recovery of a multilayered structure including a thermoplastic resin layer and an EVOH layer, gelation occurs due to thermal degradation during the melt molding or a degraded material adheres inside an extruder, and thus it used to be difficult to carry out continuous melt molding for a long period of time. Further, since such a degraded material is often mixed into a molded product, there used to be problems of generating a fish eye and generating a phase separation foreign matter (die build-up) in a molded product thus obtained. There also used to be a problem of generating a wave pattern on a surface due to the poor compatibility. Further, in recent years, since there is a demand for a colored molded product with good appearance due to diversified consumer needs, a multilayered structure including an EVOH layer and a thermoplastic resin layer often contains a pigment. However, when the multilayered structure is collected for reuse, a problem of generating uneven coloration has been occurring due to insufficient dispersibility of the pigment blended therein.

As a measure to solve such problems, Patent Document 1 describes a resin composition, made of: polyolefin (a); a saponified ethylene-vinyl acetate copolymer (b) having an ethylene content ratio of from 20 to 65 mol % and a degree of saponification of 96 mol % or more; an inorganic substance (c) of at least one type selected from titanium oxide, talc, calcium carbonate, mica, and a water absorbing inorganic substance; and a saponified ethylene-vinyl acetate copolymer (d) having an ethylene content ratio of from 68 to 98 mol % and a degree of saponification of 20 mol % or more. This resin composition has significantly improved compatibility of the polyolefin (a), the saponified ethylene-vinyl acetate copolymer (b), and the inorganic substance (c) and is significantly improved in a burnt on a screw, a die build-up, an increase in a pressure of an extruder, and flow abnormality.

Patent Document 2 describes a resin composition made of a thermoplastic resin, an EVOH, a colorant, and a metal salt of higher fatty acid. According to this resin composition, it is considered not to generate gels and hard spots such as an aggregated colorant even in repeated scrap return and melt molded process over a long period of time.

Patent Document 3 describes a resin composition made of a thermoplastic resin, an EVOH, an inorganic filler, and a metal salt of higher fatty acid. According to the resin composition, it is considered that a resin pressure in an extruder does not increase and the melt moldability is excellent even in repeated scrap return and a continuous operation over a long period of time.

In Patent Document 4, it is considered that a resin composition containing an ethylene-vinyl acetate copolymer and a saponified ethylene-vinyl acetate copolymer having an ethylene content of 70 mol % or more is blended into a recovery of a layered product including a polyolefin-based resin layer and an EVOH layer to be melt kneaded, thereby suppressing generation of a die build-up, suppressing discoloration, and thus obtaining a molded object excellent in appearance.

However, in the inventions described in Patent Documents 1 through 4, dispersibility of the pigment is insufficient in a molded object thus obtained and uneven coloration is prone to occur, which sometimes becomes a problem.

PRIOR ART DOCUMENTS

Patent Documents

Patent Document 1: JP 3-72541A
Patent Document 2: JP 2000-63683A
Patent Document 3: JP 2000-53812A
Patent Document 4: JP 2009-97010A

SUMMARY OF THE INVENTION

Problems to be Solved by the Invention

The present invention has made to solve the above problems, and it is an object of the present invention to provide a resin composition containing polyolefin, EVOHs, and a pigment, having good dispersibility of the pigment, and having improved uneven coloration.

Means for Solving the Problems

The above problems are solved by providing a resin composition, comprising: polyolefin (A); a saponified ethylene-vinyl acetate copolymer (B) having an ethylene content of from 20 to 65 mol % and having a degree of saponification of vinyl acetate units of 96% or more; a saponified ethylene-vinyl acetate copolymer (C) having an ethylene content of from 68 to 98 mol % and having a degree of saponification of vinyl acetate units of 20% or more; and a pigment (E), wherein a mass ratio (A/B) of the polyolefin (A) and the saponified ethylene-vinyl acetate copolymer (B) is from 3 to 99.5, a mass ratio (B/C) of the saponified ethylene-vinyl acetate copolymer (B) and the saponified ethylene-vinyl acetate copolymer (C) is from 1 to 100, a mass ratio (E/C) of the pigment (E) and the saponified ethylene-vinyl acetate copolymer (C) is from 0.04 to 50, and a content of the saponified ethylene-vinyl acetate copolymer (C) is from 0.01 to 2.4 parts by mass based on 100 parts by mass of a total amount of the polyolefin (A) and the saponified ethylene-vinyl acetate copolymer (B).

At this time, it is preferred that the resin composition comprises an ethylene-vinyl acetate copolymer (D), wherein a mass ratio (D/C) of the ethylene-vinyl acetate copolymer (D) and the saponified ethylene-vinyl acetate copolymer (C) is from 0.1 to 50.

It is more preferred that the mass ratio (B/C) of the saponified ethylene-vinyl acetate copolymer (B) and the saponified ethylene-vinyl acetate copolymer (C) is from 1 to 30, the mass ratio (D/C) of the ethylene-vinyl acetate copolymer (D) and the saponified ethylene-vinyl acetate copolymer (C) is from 0.1 to 15, the mass ratio (E/C) of the pigment (E) and the saponified ethylene-vinyl acetate copolymer (C) is from 0.04 to 1.2, and a content of the saponified ethylene-vinyl acetate copolymer (C) is from 0.2 to 2 parts by mass based on 100 parts by mass of the total amount of the polyolefin (A) and the saponified ethylene-vinyl acetate copolymer (B).

It is also preferred that the resin composition further comprises a metal salt (F) of fatty acid, wherein a mass ratio (F/E) of the metal salt (F) of fatty acid and the pigment (E) is from 0.1 to 3.

It is also preferred that the pigment (E) is an organic pigment of at least one type selected from the group consisting of an azo-based pigment, a quinacridone-based pigment, and a phthalocyanine-based pigment. It is also more preferred that the pigment (E) is an inorganic pigment of at least one type selected from the group consisting of titanium oxide, zinc oxide, zinc sulfide, carbon black, a lead-based pigment, a cadmium-based pigment, a cobalt-based pigment, an iron-based pigment, a chromium-based pigment, ultramarine blue, and prussian blue. At this time, it is more preferred that the pigment (E) is titanium oxide, and it is even more preferred that it is made of titanium oxide particles having a surface coated with a compound of metal other than titanium or a silicon compound.

It is also preferred that the resin composition further comprises a conjugated polyene compound (H), wherein a content of the conjugated polyene compound (H) is from 0.000001 to 1 parts by mass based on 100 parts by mass of a total amount of the polyolefin (A) and the saponified ethylene-vinyl acetate copolymer (B). It is also preferred that the resin composition further comprises a lubricant (I), wherein a content of the lubricant (I) is from 0.00001 to 1 parts by mass based on 100 parts by mass of a total amount of the polyolefin (A) and the saponified ethylene-vinyl acetate copolymer (B).

The above problems are also solved by providing a method of producing the above resin composition, comprising melt kneading a recovery of a multilayered structure, including a layer made of a resin composition containing the polyolefin (A) and the pigment (E) and a layer made of the saponified ethylene-vinyl acetate copolymer (B), and a recycling agent made of a resin composition containing the saponified ethylene-vinyl acetate copolymer (C). At this time, it is preferred that the recycling agent further contains an ethylene-vinyl acetate copolymer (D).

The above problems are also solved by providing a multilayered structure, comprising at least two layers of: a layer made of the above resin composition; and a layer made of a saponified ethylene-vinyl acetate copolymer having an ethylene content of from 20 to 65 mol % and having a degree of saponification of vinyl acetate units of 96% or more.

Effects of the Invention

By melt molding the resin composition of the present invention, it is enabled to provide a molded product, in particular a multilayered structure, made of the resin composition containing the polyolefin, the EVOHs, and the pigment, having good dispersibility of the pigment, and having improved uneven coloration.

MODE FOR CARRYING OUT THE INVENTION

A resin composition of the present invention, comprises: polyolefin (A); a saponified ethylene-vinyl acetate copolymer (B) having an ethylene content of from 20 to 65 mol % and having a degree of saponification of vinyl acetate units of 96% or more (hereinafter, may be abbreviated as an EVOH); a saponified ethylene-vinyl acetate copolymer (C) having an ethylene content of from 68 to 98 mol % and having a degree of saponification of vinyl acetate units of 20% or more (hereinafter, may be abbreviated as an S-EVOH); and a pigment (E).

In a preferred embodiment, the resin composition of the present invention contains the polyolefin (A), the EVOH (B), the S-EVOH (C), an ethylene-vinyl acetate copolymer (hereinafter, may be abbreviated as an EVAc) (D), and the pigment (E).

The polyolefin (A) used in the present invention contains, for example: (low density, linear low density, medium density, high density, or the like) polyethylene; an ethylene-based copolymer obtained by copolymerizing ethylene with α-olefins, such as 1-butene, 1-hexene, and 4-methyl-1-pentene, or acrylic ester; polypropylene; a propylene-based copolymer obtained by copolymerizing propylene with α-olefins, such as ethylene, 1-butene, 1-hexene, and 4-methyl-1-pentene; poly(1-butene), poly(4-methyl-1-pentene), or modified polyolefin obtained by reacting maleic anhydride to the polyolefin described above; an ionomer resin; or the like. Among all, as the polyolefin (A), a polypropylene-based resin, such as polypropylene and a propylene-based copolymer, or a polyethylene-based resin, such as polyethylene and an ethylene-based copolymer, is preferred, and a polypropylene-based resin is more preferred. One type of the polyolefin (A) may be used singly, or two or more types may also be used in combination.

The EVOH (B) used in the present invention is obtained by saponifying vinyl acetate units in an ethylene-vinyl acetate copolymer. An EVOH having a less ethylene content and having a high degree of saponification of vinyl acetate units is prone to become defective in compatibility with polyolefin. In contrast, when an EVOH has an excessively large ethylene content, the gas barrier properties decrease. In addition, an EVOH having a low degree of saponification of vinyl acetate units is prone to become defective in thermal stability of the EVOH itself. From such perspective, the EVOH (B) used in the present invention has an ethylene content of from 20 to 65 mol %. It is preferred that the ethylene content is 25 mol % or more. The ethylene content is preferably 55 mol % or less and more preferably 50 mol % or less. Meanwhile, the degree of saponification of vinyl acetate units of EVOH (B) is 96% or more, preferably 98% or more, and even more preferably 99% or more. In particular, an EVOH having an ethylene content of from 20 to 65 mol % and having a degree of saponification of 99% can provide the containers excellent in gas barrier properties by using it in layers with polyolefin.

The EVOH (B) may also have another polymerizable monomer copolymerized therein as long as not inhibiting the effects of the invention, which is generally in a range of 5 mol % or less. Such polymerizable monomer may include, for example: α-olefins, such as propylene, 1-butene, 1-hexene, and 4-methyl-1-pentene; (meth)acrylic ester; unsaturated carboxylic acid, such as maleic acid, fumaric acid, and itaconic acid; alkyl vinyl ether; N-(2-dimethylaminoethyl)

methacrylamide or its quaternary compounds, N-vinylimidazole or its quaternary compounds, N-vinylpyrrolidone, N,N-butoxymethyl acrylamide, vinyltrimethoxysilane, vinylmethyldimethoxysilane, vinyldimethylmethoxysilane, and the like.

The EVOH (B) has a melt index (MI; measured at 190° C., under the load of 2160 g) of preferably 0.1 g/10 minutes or more, more preferably 0.5 g/10 minutes or more. The EVOH (B) has a melt index of preferably 100 g/10 minutes or less, more preferably 50 g/10 minutes or less, and most preferably 30 g/10 minutes or less. At this time, from the perspective of dispersibility of the EVOH (B), a ratio [MI (B)/MI (A)] when the MI of the EVOH (B) is MI (B) and the MI (measured at 190° C., under the load of 2160 g) of polyolefin (A) is MI (A) is preferably from 0.1 to 100 and more preferably from 0.3 to 50. It should be noted that, for an MI of those having a melting point around 190° C. or more than 190° C., a value is used that is obtained by measuring at a plurality of temperatures of the melting point or higher under the load of 2160 g and plotting the results with reciprocals of absolute temperatures as abscissa against logarithms of MIs as ordinate in a semi-logarithmic graph for extrapolation to 190° C.

The S-EVOH (C) used in the present invention is a saponified ethylene-vinyl acetate copolymer having an ethylene content of from 68 to 98 mol % and having a degree of saponification of vinyl acetate units of 20% or more, and has a high ethylene content and an effect of significantly improving the compatibility of the polyolefin (A) and the EVOH (B). The S-EVOH (C) preferably has an ethylene content of 70 mol % or more, and more preferably 72 mol % or more. Meanwhile, the ethylene content is preferably 96 mol % or less and more preferably 94 mol % or less. The degree of saponification of the vinyl acetate units is more preferably 30% or more and even more preferably 40% or more. An upper limit of the degree of saponification is not particularly limited and may also be 99 mol % or more, and it is also possible to use one substantially having a degree of saponification of approximately 100%. When the ethylene content is less than 68 mol % or more than 98 mol %, or the degree of saponification of the vinyl acetate units is less than 20%, the effect of improving the compatibility of the polyolefin (A) and the EVOH (B) becomes insufficient.

The S-EVOH (C) has the ethylene content higher than the ethylene content of the EVOH (B). From the perspective of improving the compatibility of the polyolefin (A) and the EVOH (B), a difference between the ethylene content of the S-EVOH (C) and the ethylene content of the EVOH (B) is preferably 10 mol % or more and more preferably 20 mol % or more.

The S-EVOH (C) has an MI (measured at 190° C., under the load of 2160 g) of preferably 0.1 g/10 minutes or more, more preferably 0.5 g/10 minutes or more, and even more preferably 1 g/10 minutes or more. Meanwhile, the S-EVOH (C) has the MI of preferably 100 g/10 minutes or less, more preferably 50 g/10 minutes or less, and even more preferably 30 g/10 minutes or less. The S-EVOH (C) may also be modified with unsaturated carboxylic acid or a derivative thereof, and such unsaturated carboxylic acid or a derivative thereof may include, for example, acrylic acid, methacrylic acid, maleic acid, fumaric acid, and itaconic acid; methyl ester or ethyl ester of the above acids; maleic anhydride, itaconic anhydride, and the like. One type of them may be used singly, or two or more types may also be used in combination.

The pigment (E) used in the present invention is not particularly limited, and various organic and inorganic pigments are employed in accordance with a color of the intended multilayered structure. The organic pigments may include azo-based pigments, quinacridone-based pigments, and phthalocyanine-based pigments, and one type of these may be used, or two or more types may also be used.

The inorganic pigment may include oxide-based pigments, such as titanium oxide, zinc oxide, and chromium oxide; sulfide-based pigments, such as zinc sulfide, lithopone, cadmium yellow, vermilion, and cadmium red; hydroxide-based pigments, such as alumina hydrate, iron oxide yellow, and viridian; sulfate-based pigments, such as precipitated barium sulfate and barites; carbonate-based pigments, such as calcium carbonate and white lead; phosphate-based pigments, such as manganese violet; carbon black; lead-based pigments; cadmium-based pigments; cobalt-based pigments; iron-based pigments, such as iron black; chromium-based pigments, such as chrome yellow, molybdate orange, zinc chromate, and strontium chromate; ultramarine blue and prussian blue; silicate-based pigments, such as white carbon, clay, and talc, and one type of these may be used, or two or more types may also be used.

Among the above pigments, as the pigment (E) used in the present invention, in views of allowing uniform and uneven coloration and not easily impairing the thermal stability of the composition, inorganic pigments are preferred and oxide-based pigments are more preferred. Among the oxide-based pigments, from the perspective of food hygiene, titanium oxide ($TiO_2$) and zinc oxide are preferred and titanium oxide is particularly preferred.

A method of producing titanium oxide used in the present invention is not particularly limited, and those produced in a sulfuric acid method, a chlorine method, or another known method can be used, while it is preferred to use titanium oxide produced in a chlorine method from the perspective of weather resistance. When using titanium oxide produced in a chlorine method, it is preferred that an amount of residual chlorine is 500 ppm or less. When the amount of residual chlorine exceeds 500 ppm, the thermal stability of an obtained resin composition decreases, and there is a possibility of generating a degraded material, such as a scorch and a burnt, in a case of melt extrusion process over a long period of time. The amount of residual chlorine is more preferably 200 ppm or less, and even more preferably 100 ppm or less. The amount of residual chlorine in the titanium oxide can be analyzed by dissolving titanium oxide powder in hydrofluoric acid for coulometric titration of the liquid. A crystalline structure of the titanium oxide is not particularly limited and may be either a rutile type or an anatase type, while a rutile type is preferred from the perspective of weather resistance.

The titanium oxide used in the present invention is not particularly limited in its shape, while one in a particle shape is preferred. The titanium oxide preferably has an average particle diameter of, from the perspective of coloration, from 0.01 to 0.4 µm, more preferably from 0.1 to 0.3 µm, and even more preferably from 0.15 to 0.25 µm. Such an average particle diameter is calculated by measuring an equivalent circle diameter of an individual single particle from observation in an electron microscope from a number average of them.

It is preferred that the titanium oxide used in the present invention is made of titanium oxide particles having a surface coated with a compound of metal other than titanium or a silicon compound. By using the titanium oxide particles having a surface coated with a compound of metal other than titanium or a silicon compound, thermal degradation of the resin composition while melt kneading is suppressed and generation of a degraded material, such as a scorch and a burnt, in a case of melt extrusion process over a long period of time can be reduced. In addition, by suppressing the thermal degradation of the resin composition, white streaks becomes not easily generated in a shaped article thus obtained.

The compound of metal other than titanium or the silicon compound coating the titanium oxide particles is not particularly limited, and examples of it may be an oxide, sulfide, nitride, carbide, boride, chloride, carbonate, hydroxide, sulfate, nitrate, phosphate, carboxylate, or the like of aluminum, silicon, zirconium, zinc, magnesium, calcium, or the like. Among these, it is preferably an oxide, more preferably alumina ($Al_2O_3$) and/or silica ($SiO_2$), and it is particularly preferred to coat with both alumina and silica. When coating with both alumina and silica, they may coat as a multilayered structure and may also coat as a mixture, while it is more preferred to coat as a mixture.

It is preferred that an amount of coating surfaces of the titanium oxide particles with the compound of metal other than titanium or the silicon compound is from 2 to 20 parts by mass in terms of oxides based on 100 parts by mass of titanium oxide. When the amount of coating is 0.2 parts by mass or less, the effect of suppressing the thermal degradation of the resin composition while melt kneading is not obtained sufficiently and there is a risk of not obtaining the effect of reducing the generation of a degraded material, such as a scorch and a burnt, in a case of melt extrusion process over a long period of time. The amount of coating is more preferably 0.5 parts by mass or more, even more preferably 1 part by mass or more, and particularly preferably 3 parts by mass or more. In contrast, when the amount of coating exceeds 20 parts by mass, there is a risk of decreasing coloring capabilities as a white pigment. The amount of coating is more preferably 15 parts by mass or less and even more preferably 10 parts by mass or less.

As a method of coating the surfaces of the titanium oxide particles with the compound of metal other than titanium or the silicon compound, conventionally known methods can be used. For example, it may include a method comprising adding a surface treatment agent to a slurry containing titanium oxide particles and subsequently adjusting the pH in the slurry, thereby precipitating hardly-soluble oxides, hydroxides, and the like to coat the surfaces of the titanium oxide particles. When coating with alumina, a water soluble aluminum salt is used preferably as the surface treatment agent. As the water soluble aluminum salt, a metal salt of aluminic acid, in particular, its alkali metal salt such as sodium aluminate, is preferably used. When coating with silica, water soluble silicate is preferably used as the surface treatment agent. The water soluble silicate may be condensed silicate, such as water glass. An alkali metal salt, such as sodium silicate, is preferably used. Acid is usually used for pH adjustment, and inorganic strong acids, such as sulfuric acid, hydrochloric acid, and nitric acid, are preferably used.

It is also preferred that the titanium oxide used in the present invention is made of titanium oxide particles having a surface coated with an organic compound. It is preferred that an amount of coating the surfaces of the titanium oxide particles with an organic compound is from 0.1 to 1 parts by mass based on 100 parts by mass of titanium oxide. When the amount of coating is less than 0.1 parts by mass, there is a risk of causing an insufficient effect of reducing generation of a degraded material, such as a scorch and a burnt, in a case of melt extrusion process over a long period of time. In contrast, when the amount of treatment exceeds 1 part by mass, the organic treatment agent bleeds to a surface of a molded product obtained from the resin composition and there is a risk of impairing the design of a molded product.

As a method of coating the surfaces of the titanium oxide particles with the organic compound, a conventionally known method can be used. For example, it may include a method comprising adding a liquid of a surface treatment agent made of the organic compound when grinding the titanium oxide with a grinder, and evaporating the solvent while heating to process the surfaces of the titanium oxide particles. In addition, as a simple method, it may include a method comprising dropping a liquid of a surface treatment agent made of the organic compound while stirring titanium oxide particles in a Henschel mixer or the like for mixing, and evaporating the solvent while heating to process the surfaces of the titanium oxide. The surface treatment agent made of the organic compound may include polyol-based surface treatment agents, alkanolamine-based surface treatment agents, such as an organic acid salt of triethanolamine, silane-based surface treatment agents, and silicone-based surface treatment agents, and among these, polyol-based surface treatment agents are preferably used. As the polyol-based surface treatment agent, a hydrocarbon compound containing from 2 to 4 of hydroxyl groups in a molecule having a carbon atom number of 10 or less is preferred, and it may include, for example, trimethylolethane, trimethylolpropane, and pentaerythritol. The silane-based surface treatment agent may include silane coupling agents, such as alkylalkoxysilane and alkylchlorosilane, and the like. The silicone-based surface treatment agent may include dimethylpolysiloxane and the like. One type of these surface treatment agents made of an organic compound may be used, or two or more types may also be used in combination.

It is preferred that the titanium oxide particles having a surface coated with the compound of metal other than titanium or the silicon compound is further coated with an organic compound. By using the titanium oxide particles coated further with, in addition to the compound of metal other than titanium or the silicon compound, an organic compound, the thermal degradation of the resin composition while melt kneading is further suppressed and the generation of a degraded material, such as a scorch and a burnt, in a case of melt extrusion process over a long period of time is further reduced. In this case, the surfaces of the titanium oxide particles are coated with the compound of metal other than titanium or the silicon compound in accordance with the above method, followed by further coating the surfaces with an organic compound in the above method.

It is preferred to blend, as components of the resin composition of the present invention, the EVAc (D) as well as the polyolefin (A), the EVOH (B), the S-EVOH (C), and the pigment (E). Blending the EVAc (D) enables to further improve the dispersibility of the EVOH (B) and to suppress the uneven coloration in the molded product thus obtained. The EVAc (D) used in the present invention may be a random copolymer obtained by polymerizing ethylene with vinyl acetate in a known method and may also be a ternary copolymer obtained by further copolymerizing another monomer and a modified EVAc obtained by modified by grafting or the like. The content of vinyl acetate units in the EVAc (D) is preferably from 2 to 40 mol % and more preferably from 5 to 25 mol %. When the content of vinyl acetate units is less than 2 mol % or more than 40 mol %, an effect sufficient to improve the dispersibility of the EVOH (B) may not be obtained. The EVAc (D) preferably has a melt index (MI: measured at 190° C., under the load of 2160 g) of from 0.1 to 50 g/10 minutes, more preferably from 0.5 to 30 g/10 minutes, and even more preferably from 1 to 20 g/10 minutes.

As components of the resin composition of the present invention, it is also preferred to blend the metal salt (F) of fatty acid as well as the polyolefin (A), the EVOH (B), the S-EVOH (C), and the pigment (E). Containing the metal salt (F) of fatty acid in the resin composition enables suppression of generating a fish eye derived from aggregation of the pigment. The metal salt (F) of fatty acid may include a metal salt of higher aliphatic acid having a carbon number of from 10 to 26, such as lauric acid, stearic acid, myristic acid, behenic acid, and montanoic acid, particularly a metal salt of Group I, II, or III in the periodic table, which is, for example, a sodium salt, a potassium salt, a calcium salt, and a magnesium salt. It is also possible to use a zinc salt or a lead salt of the above fatty acid. Among these, a metal salt of Group II in the periodic table, such as a calcium salt and a magnesium salt, exhibits the effect by being added in a small amount. In addition, using a metal salt of metal having electronegativity of Allread (A. L. Allred) and Rochow (E. G. Rochow) of 1.5 or more, such as a zinc salt and a lead salt, enables to suppress adhesion of a degraded material of the resin composition to a screw and enables to reduce generation of a degraded material, such as a scorch and a burnt, in a case of melt extrusion process over a long period of time. It is more effective to use a metal salt of Group II in the periodic table and a metal salt of the metal having electronegativity of Allread (A. L. Allred) and Rochow (E. G. Rochow) of 1.5 or more in combination.

As the components of the resin composition of the present invention, it is preferred to blend hydrotalcite (G) as well as the polyolefin (A), the EVOH (B), the S-EVOH (C), and the pigment (E). Containing the hydrotalcite (G) in the resin composition enables to suppress the thermal degradation of the resin composition and to reduce the generation of a degraded material, such as a scorch and a burnt, in a case of melt extrusion process over a long period of time. The hydrotalcite (G) may preferably include double salt hydrotalcite (G) represented by

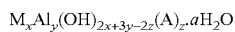

(M denotes one or more of Mg, Ca, Sr, Ba, Zn, Cd, Pb, and Sn, A denotes $CO_3$ or $HPO_4$, x, y, and z are positive numbers, a is 0 or a positive number, and $2x+3y-2z>0$).

In the above hydrotalcite, it is preferred that M is Mg, Ca, or Zn, and more preferred that it is a combination of two or more of them. Among these hydrotalcites, examples of particularly preferred ones may be as follows:

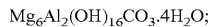

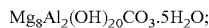

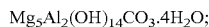

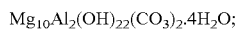

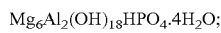

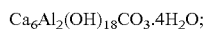

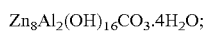

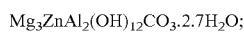

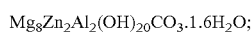

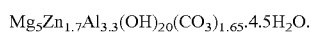

As components of the resin composition of the present invention, it is preferred to blend the conjugated polyene compound (H) as well as the polyolefin (A), the EVOH (B), the S-EVOH (C), and the pigment (E). Blending the conjugated polyene compound (H) in the resin composition of the present invention enables to improve the dispersibility of the pigment (E) by suppressing generation of aggregates of the EVOH (B) at a micro-scale level and to suppress generation of flow marks due to flow abnormality caused by aggregates of the EVOH (B) and the pigment (E). It also enables to reduce generation of a degraded material, such as a scorch and a burnt, derived from such aggregates in a case of melt extrusion process of the resin composition over a long period of time. Further, it enables to suppress coloration in yellowish brown due to thermal degradation of the resin composition and deterioration of the color phase of a shaped article thus obtained.

The conjugated polyene compound (H) used in the present invention is a compound having a structure in which a carbon-carbon double bond and a carbon-carbon single bond are alternately connected and having a number of carbon-carbon double bonds of two or more, which is a so-called conjugated double bond. The conjugated polyene compound (H) may be a conjugated diene compound having a structure in which two carbon-carbon double bonds and one carbon-carbon single bond are alternately connected, a conjugated triene compound having a structure in which three carbon-carbon double bonds and two carbon-carbon single bonds are alternately connected, or a conjugated polyene compound having a structure in which numbers of more than that of carbon-carbon double bonds and carbon-carbon single bonds are alternately connected. It should be noted that, when the number of carbon-carbon double bonds becomes eight or more, it is concerned to color a molded object by the color of the conjugated polyene compound itself, so that it is preferably a polyene having a number of carbon-carbon double bonds of seven or less. There may also be a plurality of pairs of the conjugated double bond made of two or more of carbon-carbon double bonds without conjugated to each other. For example, the conjugated polyene compound (H) also includes a compound having three conjugated trienes in a same molecule, such as tung oil. Further, the conjugated polyene compound (H) may also have, in addition to the conjugated double bonds, other functional groups, for example, various functional groups, such as a carboxyl group and a salt thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group and a salt thereof, a phosphoric acid group and a salt thereof, a phenyl group, a halogen atom, a double bond, and a triple bond.

Specific examples of the conjugated polyene compound (H) may include conjugated diene compounds having a conjugated structure of two carbon-carbon double bonds, such as isoprene, 2,3-dimethyl-1,3-butadiene, 2,3-diethyl-1, 3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid, sorbic acid ester, sorbate, and abietic acid; conjugated triene compounds having a conjugated structure of three carbon-carbon double bonds, such as 1,3,5-hexatriene, 2,4,6-octatriene-1-carboxylic acid, eleostearic acid, tung oil, and cholecalciferol; and conjugated polyene compounds having a conjugated structure of four or more of carbon-carbon double bonds, such as cyclooctatetraene, 2,4,6,8-decatetraene-1-carboxylic acid, retinol and retinoic acid. One type of these conjugated polyene compound (H) may be used singly, or two or more types of the compounds may also be used in combination.

As components of the resin composition of the present invention, it is preferred to blend the lubricant (I) as well as the polyolefin (A), the EVOH (B), the S-EVOH (C), and the pigment (E). Blending the lubricant (I) in the resin composition of the present invention has the effects of suppressing the aggregation of the EVOH (B) at a micro-scale level to improve the dispersibility of the pigment (E) and to suppress the uneven coloration. It also enables to reduce the generation of a degraded material, such as a scorch and a burnt, derived from aggregates of the EVOH (B) and the pigment (E) in a case of melt extrusion process of the resin composition over a long period of time.

Such lubricant may include higher fatty acid esters (for example, methyl ester, isopropyl ester, butyl ester, octyl ester, and the like of lauric acid, myristic acid, palmitic acid, stearic acid, behenic acid, oleic acid, and the like); higher fatty acid amides (saturated aliphatic amides, such as stearic acid amide and behenic acid amide, unsaturated fatty acid amides, such as oleic acid amide and erucic acid amide, bis-fatty acid amides, such as ethylenebis stearic acid amide, ethylenebis oleic acid amide, ethylenebis erucic acid amide, and ethylenebis lauric acid amide, and the like); low molecular weight polyolefin (for example, low molecular weight polyethylene or low molecular weight polypropylene or an acid-modified product thereof having a number average molecular weight of approximately from 500 to 10000); higher alcohol, an ethylene fluoride resin, and the like. Among these, higher fatty acid esters and higher fatty acid amides are used preferably, and higher fatty acid amides are used even more preferably.

The resin composition of the present invention contains the polyolefin (A), the EVOH (B), the S-EVOH (C), and the pigment (E), where a mass ratio (A/B) of the polyolefin (A) and the EVOH (B) is from 3 to 99.5, a mass ratio (B/C) of the EVOH (B) and the S-EVOH (C) is from 1 to 100, a mass ratio (E/C) of the pigment (E) and the S-EVOH (C) is from 0.04 to 50, and an amount of the S-EVOH (C) blended therein is from 0.01 to 2.4 parts by mass based on 100 parts by mass of a total amount of the polyolefin (A) and the EVOH (B).

Further, it is preferred that the resin composition of the present invention contains the polyolefin (A), the EVOH (B), the S-EVOH (C), the EVAc (D), and the pigment (E), where the mass ratio (B/C) of the EVOH (B) and the S-EVOH (C) is from 1 to 30, the mass ratio (D/C) of the EVAc (D) and the S-EVOH (C) is from 0.1 to 15, the mass ratio (E/C) of the pigment (E) and the S-EVOH (C) is from 0.04 to 1.2.

It is required that the mass ratio (A/B) of the polyolefin (A) and the EVOH (B) in the resin composition of the present invention is from 3 to 99.5. In a case that the mass ratio (A/B) is less than 3, that is, when there is a lot of EVOH (B), the dispersibility of the EVOH (B) in the polyolefin (A) becomes insufficient and poor dispersion of the pigment (E) occurs, and thus uneven coloration is prone to occur. It is preferred that the mass ratio (A/B) is 5 or more. It is more preferred that the mass ratio (A/B) is 7 or more. In contrast, in a case that the mass ratio (A/B) is more than 99.5, even when the resin composition of the present invention is applied to a recovery technique, it becomes poor in the effect on waste reduction and the economic efficiency for reutilization. It is preferred that the mass ratio (A/B) is 50 or less. It is more preferred that the mass ratio (A/B) is 35 or less.

It is required that the mass ratio (B/C) of the EVOH (B) and the S-EVOH (C) is from 1 to 100. In a case that the mass ratio (B/C) is more than 100, the dispersibility of the EVOH (B) becomes insufficient and poor dispersion of the pigment (E) occurs, and thus there is a risk of occurring uneven coloration. The mass ratio (B/C) is preferably 50 or less and more preferably 30 or less. It is even more preferably 18 or less and particularly preferably 15 or less. Meanwhile, even when the ratio of the S-EVOH (C) is increased as much as the mass ratio (B/C) becomes less than 1, there is a tendency not to obtain further improvement of the dispersibility. The mass ratio (B/C) is preferably 2 or more and more preferably 3 or more.

It is preferred that the mass ratio (D/C) of the EVAc (D) and the S-EVOH (C) is from 0.1 to 50. In a case that the mass ratio (D/C) is more than 50, the dispersibility of the EVOH (B) is insufficient and poor dispersion of the pigment (E) occurs, and there is a risk of occurring uneven coloration. The mass ratio (D/C) is more preferably 15 or less, even more preferably 7 or less, and particularly preferably 3.3 or less. It is most preferably 3 or less. In contrast, in a case that the mass ratio (D/C) is less than 0.1, dispersibility of the EVOH (B) is insufficient and poor dispersion of the pigment (E) occurs, and thus there is a risk of occurring uneven coloration. The mass ratio (D/C) is more preferably 1 or more and even more preferably 1.5 or more.

It is required that the mass ratio (E/C) of the pigment (E) and the S-EVOH (C) is from 0.04 to 50. In a case that the mass ratio (E/C) is more than 50, poor dispersion derived from aggregation of the pigment (E) occurs, and thus there is a risk of occurring uneven coloration. The mass ratio (E/C) is preferably 25 or less and more preferably 1.2 or less. It is even more preferably 0.8 or less. In a case that the mass ratio (E/C) is less than 0.04, dispersion of the pigment (E) is rather inhibited by the S-EVOH (C) and thus uneven coloration occurs. Accordingly, it is preferred that the mass ratio (E/C) is 0.1 or more.

It is preferred that a mass ratio (E/D) of the pigment (E) and the EVAc (D) is from 0.02 to 10. In a case that the mass ratio (E/D) is more than 10, poor dispersion derived from aggregation of the pigment (E) occurs and thus uneven coloration is prone to occur. In a case of melt extrusion process over a long period of time, a degraded material, such as a scorch and a burnt, becomes prone to be generated. The mass ratio (E/D) is more preferably 5 or less and even more preferably 1 or less. In a case that the mass ratio (E/D) is less than 0.02, dispersion of the pigment (E) is rather inhibited by the EVAc (D) and thus there is a risk of occurring uneven coloration. Therefore, the mass ratio (E/D) is more preferably 0.05 or more and even more preferably 0.08 or more.

It is preferred that the resin composition of the present invention has a structure in which particles of the EVOH (B) are dispersed in a polyolefin (A) matrix. The EVOH (B) preferably has a dispersed particle diameter of 2 μm or less and more preferably from 0.1 to 1.5 μm. In a case that the dispersed particle diameter is more than 2 μm, dispersibility of the EVOH (B) is insufficient and poor dispersion of the pigment (E) occurs, and thus there is a tendency to occur uneven coloration.

In a case there is the metal salt (F) of fatty acid in the resin composition of the present invention as a component, it is preferred that a mass ratio (F/E) of the metal salt (F) of fatty acid and the pigment (E) is from 0.1 to 3. In a case that the mass ratio (F/E) is more than 3, dispersibility of the pigment becomes insufficient and thus there is a risk of occurring uneven coloration. It is more preferred that the mass ratio (F/E) is 2.8 or less. In contrast, in a case that the mass ratio (F/E) is less than 0.1, there is a risk of generating a fish eye derived from aggregation of the pigment (E). It is more preferred that the mass ratio (F/E) is 0.2 or more.

It is required that the amount of the S-EVOH (C) blended in the resin composition of the present invention is from 0.01 to 2.4 parts by mass based on 100 parts by mass of a total amount of the polyolefin (A) and the EVOH (B). In a case that the amount of the S-EVOH (C) blended therein is large, dispersibility of the EVOH (B) is insufficient and poor dispersion of the pigment (E) occurs, and thus there is a risk of occurring uneven coloration. The amount of the S-EVOH (C) blended therein is preferably 2 parts by mass or less based on 100 parts by mass of a total amount of the polyolefin (A) and the EVOH (B) and more preferably 1.5 parts by mass or less. In contrast, also in a case that the amount of the S-EVOH (C) blended therein is small, dispersibility of the EVOH (B) is insufficient and poor dispersion of the pigment (E) occurs, and thus there is a risk of occurring uneven coloration. It is preferred that the amount of the S-EVOH (C) blended therein is 0.2 parts by mass or more based on 100 parts by mass of a total amount of the polyolefin (A) and the EVOH (B). It is more preferred that the amount is 0.3 parts by mass or more.

It is preferred that an amount of the EVAc (D) blended therein is from 0.2 to 10 parts by mass based on 100 parts by mass of a total amount of the polyolefin (A) and the EVOH (B). In a case that the amount of the EVAc (D) blended therein is large, there is a risk of decreasing the mechanical properties. It is more preferred that the amount of the EVAc (D) blended therein is 3 parts by mass or less based on 100 parts by mass of a total amount of the polyolefin (A) and the EVOH (B). In contrast, in a case that the amount of the EVAc (D) blended therein is small, dispersibility of the EVOH (B) is insufficient and poor dispersion of the pigment (E) occurs, and thus there is a risk of occurring uneven coloration. It is more preferred that the amount of the EVAc (D) blended therein is 1 part by mass or more based on 100 parts by mass of a total amount of the polyolefin (A) and the EVOH (B).

It is preferred that an amount of the pigment (E) blended therein is from 0.03 to 10 parts by mass based on 100 parts by mass of a total amount of the polyolefin (A) and the EVOH (B). In a case that the amount of the pigment (E) blended therein is large, there is a risk of generating a fish eye derived from aggregation of the pigment (E). It is more preferred that the amount of the pigment (E) blended therein is 8 parts by mass or less based on 100 parts by mass of a total amount of the polyolefin (A) and the EVOH (B). In contrast, in a case that the amount of the pigment (E) blended therein is small, dispersibility of the pigment (E) becomes insufficient and thus there is a risk of occurring uneven coloration. It is more preferred that the amount of the pigment (E) blended therein is 0.1 parts by mass or more based on 100 parts by mass of a total amount of the polyolefin (A) and the EVOH (B).

It is preferred that an amount of the metal salt (F) of fatty acid blended therein is from 0.01 to 1 parts by mass based on 100 parts by mass of a total amount of the polyolefin (A) and the EVOH (B). In a case that the amount of the metal salt (F) of fatty acid blended therein is large, there is a risk of deteriorating the color phase. It is more preferred that the amount of the metal salt (F) of fatty acid blended therein is 0.8 parts by mass or less based on 100 parts by mass of a total amount of the polyolefin (A) and the EVOH (B). In contrast, in a case that the amount of the metal salt (F) of fatty acid blended therein is small, there is a risk of generating a fish eye derived from aggregation of the EVOH (B). It is more preferred that the amount of the metal salt (F) of fatty acid blended therein is 0.03 parts by mass or more based on 100 parts by mass of a total amount of the polyolefin (A) and the EVOH (B).

It is preferred that an amount of the hydrotalcite (G) blended therein is from 0.0001 to 10 parts by mass based on 100 parts by mass of a total amount of the polyolefin (A) and the EVOH (B). In a case that the amount of the hydrotalcite (G) blended therein is small, the effect of reducing generation of a degraded material, such as a scorch and a burnt, in a case of melt extrusion process over a long period of time is sometimes not obtained sufficiently. It is more preferred that the amount of the hydrotalcite (G) blended therein is 0.001 parts by mass or more based on 100 parts by mass of a total amount of the polyolefin (A) and the EVOH (B). In contrast, in a case that the amount of the hydrotalcite (G) blended therein is large, thermal degradation of the EVOH in the resin composition thus obtained is accelerated and thus there is a risk of occurring forming due to a decomposition gas and coloration. It is more preferred that the amount of the hydrotalcite (G) blended therein is 1 part by mass or less based on 100 parts by mass of a total amount of the polyolefin (A) and the EVOH (B).

It is preferred that an amount of the conjugated polyene compound (H) blended therein is from 0.000001 to 1 parts by mass based on 100 parts by mass of a total amount of the polyolefin (A) and the EVOH (B). In a case that the amount of the conjugated polyene compound (H) blended therein is small, the effects of reducing generation of a degraded material, such as a scorch and a burnt, in a case of melt extrusion process of the resin composition over a long period of time and suppressing deterioration of the color phase of a molded article thus obtained are not sometimes obtained sufficiently. It is more preferred that the amount of the conjugated polyene compound (H) blended therein is 0.00001 parts by mass or more based on 100 parts by mass of a total amount of the polyolefin (A) and the EVOH (B). In contrast, in a case that the amount of the conjugated polyene compound (H) blended therein is large, there is a risk of accelerating gelation of a resin composition thus obtained. It is more preferred that the amount of the conjugated polyene compound (H) blended therein is 0.5 parts by mass or less based on 100 parts by mass of a total amount of the polyolefin (A) and the EVOH (B).

It is preferred that an amount of the lubricant (I) blended therein is from 0.00001 to 1 parts by mass based on 100 parts by mass of a total amount of the polyolefin (A) and the EVOH (B). In a case that the amount of the lubricant (I) blended therein is small, a flow of the resin composition is suppressed on a metal wall of a cylinder, a screw, an adapter, or the like when melt molded processing over a long period of time and thus the effect of reducing generation of a degraded material, such as a scorch and a burnt, is not sometimes obtained sufficiently. It is more preferred that the amount of the lubricant (I) blended therein is 0.00005 parts by mass or more based on 100 parts by mass of a total amount of the polyolefin (A) and the EVOH (B). In contrast, in a case that the amount of the lubricant (I) blended therein is large, the lubricant (I) is separated when a resin composition thus obtained is melt molded and thus there is a risk of decreasing adhesiveness to an adjacent layer when molding a multilayered structure. It is preferred that the amount of the lubricant (I) blended therein is 0.5 parts by mass or less based on 100 parts by mass of a total amount of the polyolefin (A) and the EVOH (B).

It is also possible to blend other additives into the resin composition of the present invention as long as not inhibiting the effects of the invention. Examples of such an additive may include an antioxidant, an ultraviolet absorber, a plasticizer, an antistatic, a filler, and other polymer compounds. Specific examples of the additives may include the following. A content of the additives is preferably 30 mass % or less based on a total mass of the resin composition and more preferably 10 mass % or less.

Antioxidant: 2,5-di-t-butylhydroquinone, 2,6-di-t-butyl-p-cresol, 4,4'-thiobis(6-t-butylphenol), 2,2'-methylenebis(4-methyl-6-t-butylphenol), octadecyl-3-(3',5'-di-t-butyl-4'-hydroxyphenyl)propionate, 4,4'-thiobis(6-t-butylphenol), and the like.

Ultraviolet Absorber: ethylene-2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Plasticizer: dimethyl phthalate, diethyl phthalate, dioctyl phthalate, wax, liquid paraffin, phosphate ester, and the like.

Antistatic: pentaerythritol monostearate, sorbitan monopalmitate, sulfated polyolefins, polyethylene oxide, carbowax, and the like.

Filler: glass fibers, asbestos, ballastnite, calcium silicate, and the like.

In addition, many other polymer compounds can also be blended into the resin composition of the present invention as long as not inhibiting the actions and the effects of the present invention.

Next, a description is given to a method of obtaining the resin composition of the present invention by mixing the polyolefin (A), the EVOH (B), the S-EVOH (C), and the pigment (E) and method of molding the resin composition.

Examples of means for mixing each component to obtain the resin composition of the present invention may be a ribbon blender, a high speed mixer cokneader, a mixing roll, an extruder, an intensive mixer, and the like.

A mixing method to obtain the resin composition of the present invention is not particularly limited, and may include: a method comprising melt kneading after dry blending the polyolefin (A), the EVOH (B), the S-EVOH (C) and the pigment (E) in one time; a method comprising melt kneading a portion of the polyolefin (A), the EVOH (B), the S-EVOH (C) and the pigment (E) in advance, followed by blending other components thereinto and melt kneading; and a method comprising melt kneading after blending a multilayered structure containing a portion of the polyolefin (A), the EVOH (B), the S-EVOH (C) and the pigment (E) into other components.

Among all, a method of melt kneading a scrap of collected chips and defective products generated when obtaining a molded object made of a multilayered structure, containing the polyolefin (A) the EVOH (B) and the pigment (E), and the S-EVOH (C) is preferred. Thus, the additive blended when melt kneading collected scraps is referred to as a recycling agent, and here, the S-EVOH (C) is used as the recycling agent. At this time, in a case of adding another component to the S-EVOH (F), it is preferred that they are melt kneaded in advance to make up a resin composition containing all of them, followed by adding it to the scraps. It is preferred that such recycling agent is blended into the scraps in the form of pellets. It is preferred that the scraps are preground into an appropriate size, and it is a preferred method of producing a resin composition of the present invention to dry blend the recycling agent in the form of pellets with the ground scraps, followed by melt kneading. As the scraps, scraps obtained from one molded object may be used and related scraps obtained from two or more molded objects may also be used by mixing them.

A particularly preferred embodiment is a method comprising melt kneading a recovery of a multilayered structure, including a layer made of a resin composition containing the polyolefin (A) and the pigment (E) and a layer made of the saponified ethylene-vinyl acetate copolymer (B), and a recycling agent made of a resin composition containing the saponified ethylene-vinyl acetate copolymer (C). At this time, a more preferred embodiment is a method comprising melt kneading a recovery of a multilayered structure, including a layer made of a resin composition containing the polyolefin (A) and the pigment (E) and a layer made of the saponified ethylene-vinyl acetate copolymer (B), and a recycling agent made of a resin composition containing the saponified ethylene-vinyl acetate copolymer (C) and the ethylene-vinyl acetate copolymer (D).

Further, the scraps as a raw material for the resin composition of the present invention may also be made of a multilayered structure including a recovery layer. That is, a molded product may be produced made of a multilayered structure including a recovery layer made of a resin composition obtained from a recovery and a scrap recovery of the molded product may also be used again as a raw material for a recovery layer in a similar multilayered structure.

When the resin composition of the present invention contains components other than the polyolefin (A), the EVOH (B), the S-EVOH (C) and the pigment (E), a method of blending those components is not particularly limited and they can be blended in operations similar to each component of the (A), (B), (C), and (E) described above. Among all, when the resin composition of the present invention contains the EVAc (D) or the metal salt (F) of fatty acid, it is preferred to add to the S-EVOH (C) to use as the recycling agent. Also in a case that the resin composition of the present invention contains the hydrotalcite (G), it is preferred to add to the S-EVOH (C) to use as the recycling agent. For a method of producing such recycling agent, similar methods as above are employed.

In a case that the conjugated polyene compound (H) is contained in the resin composition of the present invention, it may be contained in the EVOH (B) in advance and may also be added to the S-EVOH (C) to use as the recycling agent. Alternatively, it can also be blended when producing the resin composition. From the perspective of suppressing coloration in yellowish brown due to deterioration of the EVOH (B) in the resin composition when melt extrusion processing the resin composition of the present invention over a long period of time, it is preferred to contain it in the EVOH (B) in advance.

Particularly in a case that the conjugated polyene compound (H) is blended in the EVOH (B) in advance, a high effect of suppressing aggregation of the EVOH (B) at a micro-scale level can be obtained even when the amount of the conjugated polyene compound (H) blended therein is small, so that it is preferred. A method of blending the conjugated polyene compound (H) into the EVOH (B) in advance is not particularly limited, while its example may be a method comprising dissolving from 0.000001 to 10 parts by mass of the conjugated polyene compound (H) based on 100 parts by mass of the EVOH (B) in a product of dissolving the EVOH (B) in a good solvent of the EVOH (B), such as a water/methanol mixed solvent, extruding the mixed liquid from a nozzle to a poor solvent for precipitation and coagulation, and washing and drying it to obtain the EVOH (B) having the conjugated polyene compound (H) blended therein, and the like.

In a case that the lubricant (I) is contained in the resin composition of the present invention, it may be contained in the EVOH (B) in advance and may also be added to the S-EVOH (C) to use as the recycling agent. Alternatively, it can also be blended when producing the resin composition. From the perspective of suppressing generation of a degraded material, such as a scorch and a burnt, occurring when melt extrusion processing the resin composition of the present invention over a long period of time, in particular, a scorch and a burnt caused by deterioration of the EVOH (B), it is preferred to contain it in the EVOH (B) in advance.

Particularly in a case that the lubricant (I) is blended in the EVOH (B) in advance, even when the amount of the lubricant (I) blended therein is less, the effect of suppressing adhesion of the EVOH (B) to a metal wall of a cylinder, a screw, an adapter, or the like can be high, so that it is preferred. A method of blending the lubricant (I) into the EVOH (B) in advance is not particularly limited, while its example may be a method comprising melt mixing the EVOH (B) and the lubricant (I) using an extruder, and the like.

The resin composition of the present invention can be molded into any molded product, such as a film, a sheet, a tube, a bottle, and a cup using a melt extrusion molding machine, a compression molding machine, a transfer molding machine, an injection molding machine, a blow molding machine, a thermoforming machine, a rotational molding machine, a dip molding machine, or the like that is well known. An extrusion temperature while molding is appropriately selected depending on the type of the polyolefin (A) constituting the resin composition of the present invention, the melt indexes of the polyolefin (A) and the EVOH (B), the composition ratio of the polyolefin (A) and the EVOH (B), the type of the molding machine, or the like, while it is in a range of from 170 to 350° C. in many cases.

A preferred embodiment of the present invention is a multilayered structure including at least two layers of a layer made of the above resin composition and a layer made of the saponified ethylene-vinyl acetate copolymer having an ethylene content of from 20 to 65 mol % and having a degree of saponification of vinyl acetate units of 96% or more. Appropriate examples of the layer constitution are expressed, for example, as the following layer constitutions while indicating the resin composition of the present invention as c, the polyolefin as a, the EVOH as b, and the adhesive resin as ad. Here, as the ad, it is possible to preferably use a modified polyolefin resin modified with unsaturated carboxylic acid or a derivative thereof.
Three Layers c/ad/b
Four Layers a/c/ad/b
Five Layers c/ad/b/ad/c, a/ad/b/ad/c
Six Layers a/c/ad/b/ad/a, c/a/ad/b/ad/a, c/a/ad/b/ad/c, a/c/ad/b/ad/c
Seven Layers a/c/ad/b/ad/c/a It is also possible to obtain the resin composition of the present invention by melt kneading a scrap of such multilayered structure. Accordingly, in a case that there is an ad layer in the multilayered structure, it is considered that an adhesive resin (ad) is contained in the resin composition of the present invention as a component.

As a method of producing the multilayered structure, a method comprising performing so-called coextrusion molding is preferred to use a number of extruders corresponding to the types of resin layer for simultaneous extrusion molding of flows of the resins melt in this extruder in a state of laminated layers. As another method, it is also possible to employ a molding method, such as extrusion coating and dry lamination. In addition, stretching, such as uniaxial stretching, biaxial stretching, or blow stretching, of a molded product using only the resin composition of the present invention or a multilayered structure containing a resin composition of the present invention is performed, thereby enabling to obtain a molded object excellent in mechanical properties, gas barrier properties, and the like.

Since the multilayered structure having the above layer constitutions contains the EVOH excellent in barrier properties, it is useful as a packaging material for foods, medicine, medical devices requiring the gas barrier properties.

Since the resin composition of the present invention has the EVOH with high dispersibility and the pigment with high dispersibility, it is possible to provide a molded object having improved uneven coloration. Since it is excellent in the mechanical properties and the barrier properties and a molded object with a good appearance is obtained, its industrial significance is great.

EXAMPLES

In present Examples, the following raw materials were used. In Production Examples, Examples, and Comparative Examples below, parts are based on mass, unless otherwise specified.
[Polyolefin (A)]
A-1: polypropylene [density of 0.90 g/cm$^3$, melt index of 1.4 g/10 minutes (ASTM-D 1238, 230° C., load of 2160 g)]
A-2: low density polyethylene [density of 0.919 g/cm$^3$, melt index of 1.0 g/10 minutes (ASTM-D 1238, 190° C., load of 2160 g)]
[EVOH (B)]
B-1: ethylene content of 32 mol %, degree of saponification of 99.7 mol %, limiting viscosity of 1.1 dL/g at 30° C. in aqueous phenol (water/phenol=15/85 (mass ratio)), density of 1.15 g/cm$^3$, melt index of 1.6 g/10 minutes (ASTM-D 1238, 190° C., load of 2160 g)
B-2: ethylene content of 32 mol %, degree of saponification of 99.8 mol %, limiting viscosity of 0.092 dL/g at 30° C. in aqueous phenol (water/phenol=15/85 (mass ratio)), density of 1.15 g/cm$^3$, melt index of 6.6 g/10 minutes (ASTM-D 1238, 190° C., load of 2160 g)
[S-EVOH (C)]
C-1: ethylene content of 89 mol %, degree of saponification of 97 mol %, melt index of 5.1 g/10 minutes (ASTM-D 1238, 190° C., load of 2160 g)
[EVAc (D)]
D-1: vinyl acetate content of 19 mass %, melt index of 2.5 g/10 minutes (ASTM-D 1238, 190° C., load of 2160 g)
[Pigment (E)]
E-1: titanium oxide (rutile type titanium dioxide obtained by a chlorine method, white inorganic pigment, TiO$_2$, average particle diameter of 0.19 μm, chlorine content of 42 ppm)
[Metal Salt (F) of Fatty Acid]
F-1: calcium stearate
F-2: zinc stearate

[Hydrotalcite (G)]
G-1: "ZHT-4A" produced by Kyowa Chemical Industry Co., Ltd.
[Conjugated Polyene Compound (H)]
H-1: sorbic acid
[Lubricant (I)]
I-1: ethylenebis stearic acid amide
[Others]
Adhesive Resin: "MODIC AP P604V" produced by Mitsubishi Chemical Corporation (brand for polypropylene), density of 0.90 g/cm$^3$, melt index of 3.2 g/10 minutes (ASTM-D 1238, 230° C., load of 2160 g),
Antioxidant: pentaerythritol-tetrakis[3-(3,5-di-t-butyl-4-hydroxyphenyl)propionate]

Measurements were carried out in the following methods respectively for a multilayered film obtained in Example regarding a dispersed particle diameter of the EVOH (B) particles contained in a recovery layer, whiteness of the multilayered film, and uneven coloration of a thermoformed container.

[Dispersed Particle Diameter of EVOH Contained in Recovery Layer]

A multilayered film was carefully cut with a microtome in a direction perpendicular to the film surface and a recovery layer was further taken out using a scalpel. Platinum was vapor deposited on the exposed cross section in a reduced pressure atmosphere. The cross section with platinum vapor deposited thereon was taken in a picture using a scanning electron microscope (SEM) with 10000 magnification, a region in this picture including approximately 20 particles of the EVOH (E) was selected, particle diameters of the respective particle images in the region were measured, and their average value was calculated to define it as a dispersed particle diameter. For the particle diameters of the respective particles, a longer diameter (longest part) of the particles observed in the picture was measured to define it as the particle diameter. The film was cut vertically in a direction of extrusion, and the picture was taken from a direction vertical to the cross section.

[Whiteness of Multilayered Film]

A multilayered film was measured using a spectroscopic color difference meter (Spectro Color Meter SE2000, manufactured by NDK, Incorporated) in accordance with a method of ASTM E313. Whiteness was applied only in a case of the pigment (E) being titanium oxide. High whiteness indicates good dispersion of the pigment in the resin composition.

[Uneven Coloration of Thermoformed Container]

Five thermoformed containers were prepared at random and a side of each container was seen through a fluorescent lamp to visually check the following conditions.
A: No shadow is found at all in all containers.
B: Shadows can be found in several areas when looked carefully.
C: Shadows can be found.

In accordance with the following methods, titanium oxides coated with alumina and/or silica (E-2 through E-5) were obtained.
E-2:

Based on 100 parts of E-1 (titanium oxide) as the pigment (E), 4.0 parts, in terms of alumina, of an aqueous sodium aluminate solution was added and it was stirred for 30 minutes. To this, 20% sulfuric acid was added gradually for adjustment at pH=7.0 to be further matured for 2 hours. After maturation, a slurry of titanium oxide having a surface coated with the water-containing alumina was filtered, and washed with running water, followed by drying. The titanium oxide thus obtained was ground in a steam mill to obtain titanium oxide (E-2) having a surface coated with alumina and having an average particle diameter of 0.2 μm. The amount of chlorine contained in E-2 was 35 ppm.
E-3:

Octyltriethoxysilane was diluted with pure water in 2-fold and it was stirred and hydrolyzed for 10 minutes to prepare a hydrolysis product solution. The octyltriethoxysilane hydrolysis product solution was added when grinding E-2 above in a steam mill, and coating treatment was carried out on a surface of the titanium oxide in an amount of coating at 0.3% based on the titanium oxide pigment weight to obtain titanium oxide having a surface coated with alumina and an alkylsilane compound (E-3). The amount of chlorine contained in E-3 was 34 ppm.
E-4:

Based on 100 parts of E-1 (titanium oxide) as the pigment (E), 3.2 parts, in terms of alumina, of an aqueous sodium aluminate solution and 2.1 parts, in terms of silica, of an aqueous sodium silicate solution were added and it was stirred for 30 minutes. To this, 20% sulfuric acid was gradually added for adjustment at pH=7.0 to be further matured for 2 hours. After maturation, a slurry of titanium oxide having a surface coated with a mixture of alumina and silica in a water-containing state was filtered, and washed with running water, followed by drying to obtain titanium oxide having a surface coated with a mixture of alumina and silica. The titanium oxide thus obtained was ground in a steam mill to obtain titanium oxide having a surface coated with a mixture of alumina and silica and having an average particle diameter of 0.24 μm (E-4). The amount of chlorine contained in E-4 was 20 ppm.
E-5:

Based on 100 parts of E-1 (titanium oxide) as the pigment (E), 3.2 parts, in terms of alumina, of an aqueous sodium aluminate solution and 2.1 parts, in terms of silica, of an aqueous sodium silicate solution were added and it was stirred for 30 minutes. To this, 20% sulfuric acid was gradually added for adjustment at pH=7.0 to be further matured for 2 hours. After maturation, a slurry of titanium oxide having a surface coated with a mixture of alumina and silica in a water-containing state was filtered, and washed with running water, followed by drying to obtain titanium oxide having a surface coated with a mixture of alumina and silica. Subsequently, while titanium oxide was stirred in a Henschel mixer, 0.2 parts of trimethylolethane (polyol) was added to be stirred for 10 minutes, and it was further ground in a steam mill to obtain titanium dioxide (E-5) having a surface coated with polyol and a mixture of alumina and silica and having an average particle diameter of 0.24 μm. The amount of chlorine contained in E-5 was 20 ppm.

In accordance with the following methods, masterbatches (MB1 through MB10) were obtained.
MB1

Using C-1 as the S-EVOH (C), D-1 as the EVAc (D), F-1 as the metal salt (F) of fatty acid, G-1 as the hydrotalcite (G), and an antioxidant, they were blended by dry blending to have a mass ratio of C-1/D-1/F-1/G-1/antioxidant=25/67.5/5/2.5/0.2. A mixture thus obtained was melt kneaded at an extrusion temperature of 200° C. using a corotating twin screw extruder (TEX-30N manufactured by Japan Steel Works, Ltd.) of 30 mmφ, followed by pelletizing to obtain a masterbatch (MB1).
MB2

In a same manner as MB1 other than using C-1 as the S-EVOH (C), D-1 as the EVAc (D), F-1 as the metal salt (F) of fatty acid, G-1 as the hydrotalcite (G), and an antioxidant and blending them by dry blending to have a mass ratio of C-1/D-1/F-1/G-1/antioxidant=10/82.5/5/2.5/0.2, a masterbatch (MB2) was obtained.

MB3

In a same manner as MB1 other than using C-1 as the S-EVOH (C), D-1 as the EVAc (D), F-1 as the metal salt (F) of fatty acid, G-1 as the hydrotalcite (G), and an antioxidant and blending them by dry blending to have a mass ratio of C-1/D-1/F-1/G-1/antioxidant=25/71.5/1/2.5/0.2, a masterbatch (MB3) was obtained.

MB4

In a same manner as MB1 other than using C-1 as the S-EVOH (C), D-1 as the EVAc (D), F-1 as the metal salt (F) of fatty acid, G-1 as the hydrotalcite (G), and an antioxidant and blending them by dry blending to have a mass ratio of C-1/D-1/F-1/G-1/antioxidant=25/52.5/20/2.5/0.2, a masterbatch (MB4) was obtained.

MB5

In a same manner as MB1 other than using C-1 as the S-EVOH (C), D-1 as the EVAc (D), F-1 as the metal salt (F) of fatty acid, G-1 as the hydrotalcite (G), and an antioxidant and blending them by dry blending to have a mass ratio of C-1/D-1/F-1/G-1/antioxidant=5/85/5/5/0.2, a masterbatch (MB5) was obtained.

MB6

In a same manner as MB1 other than using C-1 as the S-EVOH (C), D-1 as the EVAc (D), F-1 as the metal salt (F) of fatty acid, G-1 as the hydrotalcite (G), and an antioxidant and blending them by dry blending to have a mass ratio of C-1/D-1/F-1/G-1/antioxidant=85/5/5/5/0.2, a masterbatch (MB6) was obtained.

MB7

Using C-1 as the S-EVOH (C), D-1 as the EVAc (D), F-1 as the metal salt (F) of fatty acid, and an antioxidant, they were blended by dry blending to have a mass ratio of C-1/D-1/F-1/antioxidant=25/70/5/0.2. A mixture thus obtained was melt kneaded at an extrusion temperature of 200° C. using a corotating twin screw extruder (TEX-30N manufactured by Japan Steel Works, Ltd.) of 30 mm$\phi$, followed by pelletizing to obtain a masterbatch (MB7).

MB8

In a same manner as MB1 other than using polyolefin (A-2) instead of the EVAc (D), a masterbatch (MB8) was obtained.

MB9

Using C-1 as the S-EVOH (C), D-1 as the EVAc (D), F-2 as the metal salt (F) of fatty acid, G-1 as the hydrotalcite (G), and an antioxidant, they were blended by dry blending to have a mass ratio of C-1/D-1/F-2/G-1/antioxidant=25/67.5/5/2.5/0.2. A mixture thus obtained was melt kneaded at an extrusion temperature of 200° C. using a corotating twin screw extruder (TEX-30N manufactured by Japan Steel Works, Ltd.) of 30 mm$\phi$, followed by pelletizing to obtain a masterbatch (MB9).

MB10

Using C-1 as the S-EVOH (C), D-1 as the EVAc (D), F-1 and F-2 as the metal salt (F) of fatty acid, G-1 as the hydrotalcite (G), and an antioxidant, they were blended by dry blending to have a mass ratio of C-1/D-1/F-1/F-2/G-1/antioxidant=25/65/2.5/5/2.5/0.2. A mixture thus obtained was melt kneaded at an extrusion temperature of 200° C. using a corotating twin screw extruder (TEX-30N manufactured by Japan Steel Works, Ltd.) of 30 mm$\phi$, followed by pelletizing to obtain a masterbatch (MB10).

Example 1

Production of Recovery

Using A-1 as the polyolefin (A) for outermost layers, B-1 as the EVOH (B) for an innermost layer, "MODIC AP P604V" for the adhesive resin layers, three-type five-layer coextrusion of polyolefin layer/adhesive resin layer/EVOH layer/adhesive resin layer/polyolefin layer=200µ/20µ/20µ/20µ/200µ was carried out with a feedblock die to prepare a multilayered film. The respective resins were supplied to the feedblock using a 32 mm$\phi$ extruder for the polyolefin layers, a 25 mm$\phi$ extruder for the adhesive resin layers, and a 20 mm$\phi$ extruder for the EVOH layer, respectively, and it was carried out at the temperature for extrusion at 220° C. for each resin, and also at 220° C. in a die section and a feedblock section.

Subsequently, the multilayered film thus obtained was ground with a grinder of 8 mm$\phi$ diameter meshes to obtain a recovery. A recovery thus obtained had a mass ratio of polyolefin (A-1)/EVOH (B-1)/adhesive resin=85.9/5.5/8.6.

[Preparation of Multilayered Structure Containing Pigment]

Using a mixture of a recovery, a masterbatch (MB1), and a pigment (E-1) dry blended at a mass ratio of recovery/masterbatch (MB1)/pigment (E-1)=100/3/0.3 for outermost layers, the EVOH (B-1) for an innermost layer, and "MODIC AP P604V" for the adhesive resin layers, three-type five-layer coextrusion of mixture layer/adhesive resin layer/EVOH layer/adhesive resin layer/mixture layer=200µ/20µ/20µ/20µ/200µ was carried out with a feedblock die to prepare a multilayered film. The respective resins were supplied to the feedblock using a 32 mm$\phi$ extruder for the mixture layers, a 25 mm$\phi$ extruder for the adhesive resin layers, a 20 mm$\phi$ extruder for the EVOH layer, respectively, and it was carried out at the temperature for extrusion at 220° C. for each resin, and also at 220° C. in a die section and a feedblock section.

The whiteness of the multilayered film having mixture layers and the particle diameter of the EVOH (B) in the mixture layers were measured. Results are shown in Table 1 in collection.

The multilayered film having the mixture thus obtained was thermoformed to obtain a thermoformed container. Forming conditions were as follows. Thermoforming Machine: vacuum pressure deep draw forming machine, model FX-0431-3 (manufactured by Asano Seisakusho)
Compressed Air Pressure: 5 kgf/cm$^2$
Die Shape (Round Cup Shape): top of 75 mm$\phi$, bottom of 60
mm$\phi$, depth of 75 mm, drawing ratio S=1.0
Die Temperature: 70° C.
Sheet Temperature: 130° C.
Heater Temperature: 400° C.
Plug Dimensions: 45$\phi$×65 mm
Plug Temperature: 120° C.

The uneven coloration of the thermoformed container thus obtained was evaluated. Results and conditions were shown in Table 1 in collection.

Example 2

In a same manner as Example 1 other than using a masterbatch (MB2) instead of the masterbatch (MB1), a multilayered film having mixture layers was prepared to obtain a thermoformed container, and they were evaluated. Results are shown in Table 1 in collection.

Example 3

In a same manner as Example 1 other than using a masterbatch (MB3) instead of the masterbatch (MB1), a multilayered film having mixture layers was prepared to obtain a thermoformed container, and they were evaluated. Results are shown in Table 1 in collection.

Example 4

In a same manner as Example 1 other than using a masterbatch (MB4) instead of the masterbatch (MB1), a multilayered film having mixture layers was prepared to obtain a thermoformed container, and they were evaluated. Results are shown in Table 1 in collection.

Example 5

In a same manner as Example 1 other than coextrusion molding using a mixture of a recovery, a masterbatch (MB1), and a pigment (E-1) dry blended at a mass ratio of recovery/masterbatch (MB1)/pigment (E-1)=100/3/0.05 for outermost layers, a multilayered film having mixture layers was prepared to obtain a thermoformed container, and they were evaluated. Results are shown in Table 1 in collection.

Example 6

In a same manner as Example 1 other than preparing a recovery having layer thicknesses of polyolefin layer/adhesive resin layer/EVOH layer/adhesive resin layer/polyolefin layer=200μ/20μ/4μ/20μ/200μ in the production of a recovery of Example 1, a multilayered film having mixture layers was prepared to obtain a thermoformed container, and they were evaluated. The mass ratio of each component of the recovery was polyolefin (A-1)/saponified ethylene-vinyl acetate copolymer (B-1)/adhesive resin=89.9/1.1/9. Results are shown in Table 1 in collection.

Example 7

In a same manner as Example 1 other than using a masterbatch (MB7) instead of the masterbatch (MB1), a multilayered film having mixture layers was prepared to obtain a thermoformed container, and they were evaluated. Results are shown in Table 1 in collection.

Example 8

In a same manner as Example 1 other than, using polyolefin containing a pigment having polyolefin (A-1) and a pigment (E-1) dry blended at a mass ratio of polyolefin (A-1)/pigment (E-1)=100/0.3 for outermost layers, B-1 as the EVOH (B) for an innermost layer, "MODIC AP P604V" for the adhesive resin layers, preparing a multilayered film by carrying out three-type five-layer coextrusion of polyolefin layer/adhesive resin layer/EVOH layer/adhesive resin layer/polyolefin layer=200μ/20μ/20μ/20μ/200μ with a feedblock die in the production of a recovery of Example 1, a multilayered film having mixture layers was prepared to obtain a thermoformed container, and they were evaluated. Results are shown in Table 1 in collection.

Example 9

In a same manner as Example 1 other than using a masterbatch (MB5) instead of the masterbatch (MB1), a multilayered film having mixture layers was prepared to obtain a thermoformed container, and they were evaluated. Results are shown in Table 1 in collection.

Example 10

In a same manner as Example 1 other than using a masterbatch (MB8) instead of the masterbatch (MB1), a multilayered film having mixture layers was prepared to obtain a thermoformed container, and they were evaluated. Results are shown in Table 1 in collection. It should be noted that the content of the polyolefin (A) shown in Table 1 represents a total of the polyolefin (A-1) and the polyolefin (A-2).

Comparative Example 1

In a same manner as Example 1 other than preparing a recovery using a multilayered film having layer thicknesses of polyolefin layer/adhesive resin layer/EVOH layer/adhesive resin layer/polyolefin layer=200μ/20μ/120μ/20μ/200μ in the production of a recovery of Example 1, a multilayered film having mixture layers was prepared to obtain a thermoformed container, and they were evaluated. The mass ratio of each component of the recovery was polyolefin (A-1)/saponified ethylene-vinyl acetate copolymer (B-1)/adhesive resin=67.4/25.8/6.7. Results are shown in Table 1 in collection.

Comparative Example 2

In a same manner as Example 1 other than using a masterbatch (MB6) instead of the masterbatch (MB1) in Example 1, a multilayered film having mixture layers was prepared to obtain a thermoformed container, and they were evaluated. Results are shown in Table 1 in collection.

Comparative Example 3

In a same manner as Example 1 other than using a mixture of a recovery, a masterbatch (MB1), and a pigment (E-1) dry blended at a mass ratio of recovery/masterbatch (MB1)/pigment (E-1)=100/3/0.025 for outermost layers in Example 1, a multilayered film having mixture layers was prepared to obtain a thermoformed container, and they were evaluated. Results are shown in Table 1 in collection.

TABLE 1

|  | Example 1 | Example 2 | Example 3 | Example 4 | Example 5 | Example 6 | Example 7 | Example 8 |
|---|---|---|---|---|---|---|---|---|
| Resin Composition |  |  |  |  |  |  |  |  |
| Conditions |  |  |  |  |  |  |  |  |
| Composition (parts by mass) |  |  |  |  |  |  |  |  |
| Polyolefin (A) | 85.9 | 85.9 | 85.9 | 85.9 | 85.9 | 89.9 | 85.9 | 85.9 |
| EVOH (B) | 5.5 | 5.5 | 5.5 | 5.5 | 5.5 | 1.1 | 5.5 | 5.5 |

TABLE 1-continued

|  | | | | | | | | |
|---|---|---|---|---|---|---|---|---|
| S-EVOH (C) | 0.75 | 0.3 | 0.75 | 0.75 | 0.75 | 0.75 | 0.75 | 0.75 |
| EVAc (D) | 2 | 2.5 | 2.1 | 1.6 | 2 | 2 | 2.1 | 2 |
| Pigment (E) | 0.3 | 0.3 | 0.3 | 0.3 | 0.05 | 0.3 | 0.3 | 0.56 |
| Metal salt (F) of fatty acid | 0.15 | 0.15 | 0.03 | 0.60 | 0.15 | 0.15 | 0.15 | 0.15 |
| Hydrotalcite (G) | 0.075 | 0.075 | 0.075 | 0.075 | 0.075 | 0.075 | 0 | 0.075 |
| Adhesive resin | 8.6 | 8.6 | 8.6 | 8.6 | 8.6 | 9 | 8.6 | 8.6 |
| Antioxidant | 0.006 | 0.006 | 0.006 | 0.006 | 0.006 | 0.006 | 0.006 | 0.006 |
| Mass Ratio | | | | | | | | |
| (A/B) | 15.6 | 15.6 | 15.6 | 15.6 | 15.6 | 81.7 | 15.6 | 15.6 |
| (B/C) | 7.3 | 18.3 | 7.3 | 7.3 | 7.3 | 1.5 | 7.3 | 7.3 |
| (D/C) | 2.7 | 8.3 | 2.9 | 2.1 | 2.7 | 2.7 | 2.8 | 2.7 |
| (E/C) | 0.4 | 1 | 0.4 | 0.4 | 0.07 | 0.4 | 0.4 | 0.75 |
| (E/D) | 0.15 | 0.12 | 0.14 | 0.19 | 0.02 | 0.15 | 0.14 | 0.28 |
| (F/E) | 0.5 | 0.5 | 0.1 | 2 | 3 | 0.5 | 0.5 | 0.3 |
| Content of (C) *1 | 0.82 | 0.33 | 0.82 | 0.82 | 0.82 | 0.82 | 0.82 | 0.82 |
| Evaluation Results | | | | | | | | |
| EVOH particle diameter (μ) | 1.2 | 1.7 | 1.3 | 1.3 | 1.3 | 1.2 | 1.4 | 1.2 |
| Uneven coloration | A | A | A | A | A | A | A | A |
| Whiteness | 92.3 | 91.3 | 91.6 | 92.0 | 90.1 | 92.1 | 90.5 | 92.3 |

| | Example 9 | Example 10 | Comparative Example 1 | Comparative Example 2 | Comparative Example 3 |
|---|---|---|---|---|---|
| Resin Composition Conditions Composition (parts by mass) | | | | | |
| Polyolefin (A) | 85.9 | 87.9 | 67.4 | 85.9 | 85.9 |
| EVOH (B) | 5.5 | 5.5 | 25.8 | 5.5 | 5.5 |
| S-EVOH (C) | 0.15 | 0.75 | 0.75 | 2.5 | 0.75 |
| EVAc (D) | 2.5 | — | 2 | 0.15 | 2 |
| Pigment (E) | 0.3 | 0.3 | 0.3 | 0.3 | 0.025 |
| Metal salt (F) of fatty acid | 0.15 | 0.15 | 0.15 | 0.15 | 0.15 |
| Hydrotalcite (G) | 0.15 | 0.075 | 0.075 | 0.15 | 0.075 |
| Adhesive resin | 8.6 | 8.6 | 6.7 | 8.6 | 8.6 |
| Antioxidant | 0.006 | 0.006 | 0.006 | 0.006 | 0.006 |
| Mass Ratio | | | | | |
| (A/B) | 15.6 | 16.0 | 2.6 | 15.6 | 15.6 |
| (B/C) | 36.7 | 7.3 | 34.5 | 2.2 | 7.3 |
| (D/C) | 17 | — | 2.7 | 0.059 | 2.7 |
| (E/C) | 2 | 0.4 | 0.4 | 0.12 | 0.03 |
| (E/D) | 0.12 | — | 0.15 | 2 | 0.01 |
| (F/E) | 0.5 | 0.5 | 0.5 | 0.5 | 6 |
| Content of (C) *1 | 0.16 | 0.80 | 0.80 | 2.78 | 0.82 |
| Evaluation Results | | | | | |
| EVOH particle diameter (μ) | 2.1 | 2.0 | 2.3 | 2.5 | 1.3 |
| Uneven coloration | B | B | C | C | C |
| Whiteness | 90.2 | 90.4 | 87.1 | 88.9 | 86.1 |

*1 Content of (C) based on 100 parts by mass of (A) + (B)
(parts by mass)

According to the above results, in Example 1 having all of the mass ratio (A/B) of the polyolefin (A) and the EVOH (B), the mass ratio (B/C) of EVOH (B)/S-EVOH (C), the mass ratio (E/C) of pigment (E)/S-EVOH (C), and the content of the S-EVOH (C) in the range of claims, a molded object having a small particle diameter of the EVOH (B) and good dispersibility thereof, excellent in whiteness without uneven coloration was obtained In both Comparative Example 1 having a large thickness of the EVOH (B) in the recovery, and as a result, having a large amount of EVOH (B) and Comparative Example 2 having a large amount of S-EVOH (C) in the masterbatch, the particle diameter of the EVOH (B) in the resin composition became large, there was uneven coloration, and the whiteness was insufficient. In Comparative Example 3 having a small amount of pigment (E), the particle diameter of EVOH (B) was small. However, the dispersibility of the pigment was insufficient, there was uneven coloration, and the whiteness was insufficient.

Example 11

The evaluation results of the multilayered film having mixture layers and the thermoformed container in Example 1 are shown again in Table 2 as Example 11. Further, a single layer film was prepared as follows for evaluation. Evaluation results are shown in Table 2.

[Preparation of Single Layer Structure Containing Pigment]

Using a mixture of the recovery obtained in Example 1, a masterbatch (MB1), and a pigment (E-1) dry blended at a mass ratio of recovery/masterbatch (MB1)/pigment (E-1)

=100/3/0.3, extrusion molding of a 100 μm single layer film was carried out for 48 hours. The extrusion molding of the mixture was carried out using a 32 mmφ extruder at a temperature for extrusion of 220° C. and at a temperature in a die section of 220° C.

[Evaluation of White Streaks in Single Layer Film]

The single layer film was cut out in 20 cm×20 cm and presence of white streaks in the single layer film was visually checked to evaluate the presence of white streaks as follows. Results are shown in Table 2.
A: No white streak was generated at all.
B: Small white streaks were slightly generated.
C: Large white streaks were generated.

[Measurement of YI Value of Single Layer Film]

As a surface color of the single layer film, a YI value was measured in conformity to JIS-K-7103. Results are shown in Table 2.

[Measurement of Screw Adhesion Amount After Extrusion of Single Layer Film]

After carrying out extrusion of a single layer film for 48 hours, 2 kg of LDPE ("NOVATEC LD LA320" produced by Japan polyethylene Corporation) was continuously charged to carry out purging of the extruder, the adapter, and the die. After finished flowing the LDPE, the operation was stopped to take out a screw and the LDPE remained on the screw was eliminated, and the deteriorated screw build-up was collected to weight the mass of the screw build-up thus obtained. Results are shown in Table 2.

Example 12

Based on 100 parts of EVOH chips of B-1 as the EVOH (B), 0.02 parts of I-1 was added as the lubricant (I) for dry blending, and it was shaken until the lubricant (I) was dispersed uniformly on the surfaces of the EVOH chips to obtain a mixture of the EVOH (B-1) and the lubricant (I-1).

In a same manner as Example 1 other than using the mixture obtained as above instead of B-1 in Example 1, a recovery was produced to prepare a multilayered film having mixture layers and a thermoformed container was obtained to evaluate them. Results are shown in Table 2 in collection. In addition, in a same manner as Example 11 other than using the recovery produced as above instead of the recovery obtained in Example 1 in Example 11, a single layer film was prepared to carry out evaluation of white streaks in the single layer film, measurement of a YI value, and measurement of a screw adhesion amount after extrusion of the single layer film. Results are shown in Table 2 in collection.

Example 13

As the EVOH (B), 2000 parts of B-2 was put into 18000 parts of mixed solvent of water/methanol=40/60 (mass ratio) and it was stirred at 60° C. for six hours to be dissolved completely. To this solution, 2 parts of H-1 (sorbic acid) as the conjugated polyene compound (H) was added, and it was further stirred at 60° C. for one hour to completely dissolve H-1, and thus an EVOH solution containing the conjugated polyene compound (H-1) was obtained. This EVOH solution was continuously extruded from a nozzle having a diameter of 4 mm into a coagulation bath of water/methanol=95/5 (mass ratio) adjusted at 0° C. to coagulate the EVOH in strands. This strand was introduced into a pelletizer to obtain porous EVOH chips. After washing the porous EVOH chips thus obtained in order using 2000 parts of a 0.1 mass %, based on 100 parts of the chips, aqueous acetic acid solution and subsequently 2000 parts of ion exchanged water at 20° C., they were immersed in 2000 parts of an aqueous solution containing 0.092% boric acid at 20° C. for four hours. The EVOH chips were subjected to deliquoring and separation to carry out drying with a hot air dryer at 80° C. for four hours, and further drying at 100° C. for sixteen hours, and thus EVOH chips of the EVOH (B-2) containing the conjugated polyene compound (H-1) were obtained. The H-1 (sorbic acid) content in the EVOH chips thus obtained was 0.01 parts based on 100 parts of EVOH, and the boric acid content was 0.019 in terms of boron. The EVOH chips had a melt index (ASTM-D 1238, 190° C., load of 2160 g) of 1.6 g/10 minutes.

In a same manner as Example 1 other than using the EVOH chips of the EVOH (B-2) containing the conjugated polyene compound (H-1) obtained as above instead of B-1 in Example 1, a recovery was produced to prepare a multilayered film having mixture layers and a thermoformed container was obtained to evaluate them. Results are shown in Table 2 in collection. In addition, in a same manner as Example 11 other than using the recovery produced as above instead of the recovery obtained in Example 1 in Example 11, a single layer film was prepared to carry out evaluation of white streaks in the single layer film, measurement of a YI value, and measurement of a screw adhesion amount after extrusion of the single layer film. Results are shown in Table 2 in collection.

Example 14

Based on 100 parts of EVOH chips of the EVOH (B-2) containing the conjugated polyene compound (H-1) obtained in Example 13, 0.02 parts of I-1 (ethylene stearic acid bisamide) was added as the lubricant (I) for dry blending, and it was shaken until the lubricant (I) was dispersed uniformly on the surfaces of the EVOH chips to obtain a mixture of the EVOH (B-2) containing the conjugated polyene compound (H-1) and the lubricant (I-1).

In a same manner as Example 1 other than using the mixture obtained as above instead of B-1 in Example 1, a recovery was produced to prepare a multilayered film having mixture layers and a thermoformed container was obtained to evaluate them. Results are shown in Table 2 in collection. In addition, in a same manner as Example 11 other than using the recovery produced as above instead of the recovery obtained in Example 1 in Example 11, a single layer film was prepared to carry out evaluation of white streaks in the single layer film, measurement of a YI value, and measurement of a screw adhesion amount after extrusion of the single layer film. Results are shown in Table 2 in collection.

Example 15

In a same manner as Example 14 other than using a masterbatch (MB8) instead of a masterbatch (MB1), a recovery was produced to prepare a multilayered film having mixture layers and a thermoformed container was obtained for evaluation. Results are shown in Table 2 in collection. In addition, in a same manner as Example 14 other than using the recovery produced as above instead of the recovery obtained in Example 14 in Example 14, a single layer film was prepared to carry out evaluation of white streaks in the single layer film, measurement of a YI value, and measurement of a screw adhesion amount after extrusion of the single layer film. Results are shown in Table 2 in collection. Here, the content of the polyolefin (A) shown in Table 2 represents a total of the polyolefin (A-1) and the polyolefin (A-2).

Example 16

In a same manner as Example 12 other than using E-2 instead of E-1 as the pigment in Example 12, a multilayered film having mixture layers was prepared and a thermoformed container was obtained to evaluate them. In addition, in a same manner as Example 12 other than using E-2 instead of E-1 as the pigment in Example 12, a single layer film was prepared to carry out evaluation of white streaks in the single layer film, measurement of a YI value, and measurement of a screw adhesion amount after extrusion of the single layer film. Results are shown in Table 2 in collection.

Example 17

In a same manner as Example 13 other than using E-2 instead of E-1 as the pigment in Example 13, a multilayered film having mixture layers was prepared and a thermoformed container was obtained to evaluate them. In addition, in a same manner as Example 13 other than using E-2 instead of E-1 as the pigment in Example 13, a single layer film was prepared to carry out evaluation of white streaks in the single layer film, measurement of a YI value, and measurement of a screw adhesion amount after extrusion of the single layer film. Results are shown in Table 2 in collection.

Example 18

In a same manner as Example 14 other than using E-2 instead of E-1 as the pigment in Example 14, a multilayered film having mixture layers was prepared and a thermoformed container was obtained to evaluate them. In addition, in a same manner as Example 14 other than using E-2 instead of E-1 as the pigment in Example 14, a single layer film was prepared to carry out evaluation of white streaks in the single layer film, measurement of a YI value, and measurement of a screw adhesion amount after extrusion of the single layer film. Results are shown in Table 2 in collection.

Example 19

In a same manner as Example 18 other than using a masterbatch (MB9) instead of a masterbatch (MB1) in Example 18, a multilayered film having mixture layers was prepared and a thermoformed container was obtained to evaluate them. In addition, in a same manner as Example 18 other than using a masterbatch (MB9) instead of a masterbatch (MB1) in Example 18, a single layer film was prepared to carry out evaluation of white streaks in the single layer film, measurement of a YI value, and measurement of a screw adhesion amount after extrusion of the single layer film. Results are shown in Table 2 in collection.

Example 20

In a same manner as Example 18 other than using a masterbatch (MB10) instead of a masterbatch (MB1) in Example 18, a multilayered film having mixture layers was prepared and a thermoformed container was obtained to evaluate them. In addition, in a same manner as Example 18 other than using a masterbatch (MB10) instead of a masterbatch (MB1) in Example 18, a single layer film was prepared to carry out evaluation of white streaks in the single layer film, measurement of a YI value, and measurement of a screw adhesion amount after extrusion of a single layer film. Results are shown in Table 2 in collection.

Example 21

In a same manner as Example 14 other than using E-3 instead of E-1 as the pigment in Example 14, a multilayered film having mixture layers was prepared and a thermoformed container was obtained to evaluate them. In addition, in a same manner as Example 14 other than using E-3 instead of E-1 as the pigment in Example 14, a single layer film was prepared to carry out evaluation of white streaks in the single layer film, measurement of a YI value, and measurement of a screw adhesion amount after extrusion of the single layer film. Results are shown in Table 2 in collection.

Example 22

In a same manner as Example 14 other than using E-4 instead of E-1 as the pigment in Example 14, a multilayered film having mixture layers was prepared and a thermoformed container was obtained to evaluate them. In addition, in a same manner as Example 14 other than using E-4 instead of E-1 as the pigment in Example 14, a single layer film was prepared to carry out evaluation of white streaks in the single layer film, measurement of a YI value, and measurement of a screw adhesion amount after extrusion of the single layer film. Results are shown in Table 2 in collection.

Example 23

In a same manner as Example 14 other than using E-5 instead of E-1 as the pigment in Example 14, a multilayered film having mixture layers was prepared and a thermoformed container was obtained to evaluate them. In addition, in a same manner as Example 14 other than using E-5 instead of E-1 as the pigment in Example 14, a single layer film was prepared to carry out evaluation of white streaks in the single layer film, measurement of a YI value, and measurement of a screw adhesion amount after extrusion of the single layer film. Results are shown in Table 2 in collection.

TABLE 2

| | Example 11 | Example 12 | Example 13 | Example 14 | Example 15 | Example 16 | Example 17 |
|---|---|---|---|---|---|---|---|
| Resin Composition | | | | | | | |
| Conditions | | | | | | | |
| Composition (parts by mass) | | | | | | | |
| Polyolefin (A) | 85.9 | 85.9 | 85.9 | 85.9 | 87.9 | 85.9 | 85.9 |
| EVOH (B) | 5.5 | 5.5 | 5.5 | 5.5 | 5.5 | 5.5 | 5.5 |

TABLE 2-continued

|  |  |  |  |  |  |  |  |
|---|---|---|---|---|---|---|---|
| Conjugated polyene compound (H) | — | — | 0.0006 | 0.0006 | 0.0006 | — | 0.0006 |
| Lubricant (I) | — | 0.0011 | — | 0.0011 | 0.0011 | 0.0011 | — |
| S-EVOH (C) | 0.75 | 0.75 | 0.75 | 0.75 | 0.75 | 0.75 | 0.75 |
| EVAc (D) | 2 | 2 | 2 | 2 | — | 2 | 2 |
| Pigment (E) | 0.3 | 0.3 | 0.3 | 0.3 | 0.3 | 0.3 | 0.3 |
| Metal salt (F) of fatty acid | 0.15 | 0.15 | 0.15 | 0.15 | 0.15 | 0.15 | 0.15 |
| Hydrotalcite (G) | 0.075 | 0.075 | 0.075 | 0.075 | 0.075 | 0.075 | 0.075 |
| Adhesive resin | 8.6 | 8.6 | 8.6 | 8.6 | 8.6 | 8.6 | 8.6 |
| Antioxidant | 0.006 | 0.006 | 0.006 | 0.006 | 0.006 | 0.006 | 0.006 |
| Mass Ratio |  |  |  |  |  |  |  |
| (B/C) | 7.3 | 7.3 | 7.3 | 7.3 | 7.3 | 7.3 | 7.3 |
| (D/C) | 2.7 | 2.7 | 2.7 | 2.7 | — | 2.7 | 2.7 |
| (E/C) | 0.4 | 0.4 | 0.4 | 0.4 | 0.4 | 0.4 | 0.4 |
| (E/D) | 0.15 | 0.15 | 0.15 | 0.15 | — | 0.15 | 0.15 |
| (F/E) | 0.5 | 0.5 | 0.5 | 0.5 | 0.5 | 0.5 | 0.5 |
| Type |  |  |  |  |  |  |  |
| Pigment (E) | E-1 | E-1 | E-1 | E-1 | E-1 | E-2 | E-2 |
| Metal salt (F) of fatty acid | F-1 | F-1 | F-1 | F-1 | F-1 | F-1 | F-1 |
| Multilayered Film Evaluation |  |  |  |  |  |  |  |
| EVOH particle diameter (μ) | 1.2 | 1.1 | 1.2 | 1.0 | 1.9 | 1.0 | 1.1 |
| Uneven coloration | A | A | A | A | B | A | A |
| Whiteness | 92.3 | 92.8 | 93.1 | 93.7 | 91.1 | 93.3 | 93.8 |
| Single Layer Film Evaluation |  |  |  |  |  |  |  |
| White streaks | B | B | B | A | B | A | A |
| YI value | 8.5 | 7.4 | 6.3 | 5.5 | 6.5 | 4.9 | 4.6 |
| Screw adhesion degraded material amount (g) | 2.8 | 1.5 | 1.7 | 1.3 | 1.9 | 1.2 | 1.3 |

|  | Example 18 | Example 19 | Example 20 | Example 21 | Example 22 | Example 23 |
|---|---|---|---|---|---|---|
| Resin Composition Conditions Composition (parts by mass) |  |  |  |  |  |  |
| Polyolefin (A) | 85.9 | 85.9 | 85.9 | 85.9 | 85.9 | 85.9 |
| EVOH (B) | 5.5 | 5.5 | 5.5 | 5.5 | 5.5 | 5.5 |
| Conjugated polyene compound (H) | 0.0006 | 0.0006 | 0.0006 | 0.0006 | 0.0006 | 0.0006 |
| Lubricant (I) | 0.0011 | 0.0011 | 0.0011 | 0.0011 | 0.0011 | 0.0011 |
| S-EVOH (C) | 0.75 | 0.75 | 0.75 | 0.75 | 0.75 | 0.75 |
| EVAc (D) | 2 | 2 | 2 | 2 | 2 | 2 |
| Pigment (E) | 0.3 | 0.3 | 0.3 | 0.3 | 0.3 | 0.3 |
| Metal salt (F) of fatty acid | 0.15 | 0.15 | 0.22 | 0.15 | 0.15 | 0.15 |
| Hydrotalcite (G) | 0.075 | 0.075 | 0.075 | 0.075 | 0.075 | 0.075 |
| Adhesive resin | 8.6 | 8.6 | 8.6 | 8.6 | 8.6 | 8.6 |
| Antioxidant | 0.006 | 0.006 | 0.006 | 0.006 | 0.006 | 0.006 |
| Mass Ratio |  |  |  |  |  |  |
| (B/C) | 7.3 | 7.3 | 7.3 | 7.3 | 7.3 | 7.3 |
| (D/C) | 2.7 | 2.7 | 2.6 | 2.7 | 2.7 | 2.7 |
| (E/C) | 0.4 | 0.4 | 0.4 | 0.4 | 0.4 | 0.4 |
| (E/D) | 0.15 | 0.15 | 0.15 | 0.15 | 0.15 | 0.15 |
| (F/E) | 0.5 | 0.5 | 0.7 | 0.5 | 0.5 | 0.5 |
| Type |  |  |  |  |  |  |
| Pigment (E) | E-2 | E-2 | E-2 | E-3 | E-4 | E-5 |
| Metal salt (F) of fatty acid | F-1 | F-2 | F-1/F-2 | F-1 | F-1 | F-1 |
| Multilayered Film Evaluation |  |  |  |  |  |  |
| EVOH particle diameter (μ) | 0.9 | 0.7 | 0.7 | 0.8 | 0.8 | 0.7 |
| Uneven coloration | A | A | A | A | A | A |
| Whiteness | 94.2 | 94.7 | 94.9 | 95.3 | 95.4 | 95.8 |

TABLE 2-continued

| Single Layer Film Evaluation | | | | | | |
|---|---|---|---|---|---|---|
| White streaks | A | A | A | A | A | A |
| YI value | 4.1 | 4.4 | 4.2 | 3.9 | 3.8 | 3.4 |
| Screw adhesion degraded material amount (g) | 1.0 | 0.9 | 0.8 | 0.6 | 0.6 | 0.4 |

The invention claimed is:

1. A resin composition, comprising:
(A) a polyolefin;
(B) a saponified ethylene-vinyl acetate copolymer comprising an ethylene content of from 20 to 65 mol % and having a degree of saponification of vinyl acetate units of 96% or more;
(C) a saponified ethylene-vinyl acetate copolymer comprising an ethylene content of from 68 to 98 mol % and having a degree of saponification of vinyl acetate units of 20% or more;
(D) a random copolymer consisting of ethylene and vinyl acetate;
(E) a pigment; and
(I) a lubricant,
wherein:
a mass ratio of the polyolefin (A) and the saponified ethylene-vinyl acetate copolymer (B), (A/B), is from 3 to 99.5;
a mass ratio of the saponified ethylene-vinyl acetate copolymer (B) and the saponified ethylene-vinyl acetate copolymer (C), (B/C), is from 2 to 18;
a mass ratio of the random copolymer consisting of ethylene and vinyl acetate (D) and the saponified ethylene-vinyl acetate copolymer (C), (D/C), is from 0.1 to 15;
a mass ratio of the pigment (E) and the saponified ethylene-vinyl acetate copolymer (C), (E/C), is from 0.1 to 1.2;
a content of the saponified ethylene-vinyl acetate copolymer (C) is from 0.33 to 1.5 parts by mass, based on 100 parts by mass of a total amount of the polyolefin (A) and the saponified ethylene-vinyl acetate copolymer (B);
a content of the lubricant (1) is from 0.00001 to 1 parts by mass, based on 100 parts by mass of the total amount of (A) and (B);
the pigment (E) comprises titanium oxide particles comprising a surface coated with a compound of a metal other than titanium or a silicon compound; and
the titanium oxide particles have an average particle diameter of from 0.01 to 0.4 μm.

2. The resin composition of claim 1, further comprising:
(H) a conjugated polyene compound,
wherein a content of the conjugated polyene compound (H) is from 0.000001 to 1 parts by mass, based on 100 parts by mass of the total amount of (A) and (B).

3. The resin composition of claim 1,
wherein the content of the lubricant (I) is from 0.00005 to 11.5 parts by mass, based on 100 parts by mass of the total amount of (A) and (B).

4. The resin composition of claim 1, further comprising:
a metal salt (F) of fatty acid,
wherein a mass ratio of the metal salt (F) of fatty acid and the pigment (E), (F/E), is from 0.1 to 3.

5. The resin composition of claim 1, wherein the pigment (E) comprises titanium oxide particles comprising a surface coated with at least one of an oxide, sulfide, nitride, carbide, boride, chloride, carbonate, hydroxide, sulfate, nitrate, phosphate, or carboxy late of aluminum, silicon, zirconium, zinc, magnesium, or calcium.

6. The resin composition of claim 5, wherein the titanium oxide particles are coated with alumina ($Al_2O_3$), silica ($SiO_2$), or both.

7. The resin composition of claim 6, wherein the titanium oxide particles are coated with both alumina ($Al_2O_3$) and silica ($SiO_2$).

8. The resin composition of claim 7, wherein the pigment (E) comprises titanium oxide particles coated with a mixture of alumina ($Al_2O_3$) and silica ($SiO_2$).

9. The resin composition of claim 1, wherein the titanium oxide particles have an average particle diameter of from 0.1 to 0.3 μm.

10. The resin composition of claim 1, wherein the titanium oxide particles have an average particle diameter of from 0.15 to 0.25 μm.

* * * * *